United States Patent [19]
Hayes, Jr. et al.

[11] Patent Number: 5,974,312
[45] Date of Patent: Oct. 26, 1999

[54] SYSTEM AND METHOD FOR UPDATING A MEMORY IN AN ELECTRONIC DEVICE VIA WIRELESS DATA TRANSFER

[75] Inventors: John Joseph Hayes, Jr., Wake Forest; David Charles Hall, Raleigh, both of N.C.

[73] Assignee: Ericsson Inc., Research Triangle Park, N.C.

[21] Appl. No.: 08/892,262

[22] Filed: Jul. 10, 1997

[51] Int. Cl.$^6$ ............................... H04M 3/00; H04Q 7/20
[52] U.S. Cl. .......................... 455/419; 455/418; 455/425
[58] Field of Search ..................................... 455/418, 419, 455/411, 455, 425, 5.1; 395/200.51; 711/103

[56] References Cited

U.S. PATENT DOCUMENTS

| | | |
|---|---|---|
| 4,473,824 | 9/1984 | Claytor . |
| 5,109,403 | 4/1992 | Sutphin .................................. 455/419 |
| 5,297,191 | 3/1994 | Gerzberg ................................ 455/419 |
| 5,457,737 | 10/1995 | Wen ...................................... 455/53.1 |
| 5,581,723 | 12/1996 | Hasbun et al. ......................... 711/103 |
| 5,699,275 | 12/1997 | Beasley et al. ..................... 395/200.51 |
| 5,726,636 | 3/1998 | Hayes, Jr. ............................. 455/425 |
| 5,812,930 | 9/1998 | Zavrel .................................... 455/5.1 |

FOREIGN PATENT DOCUMENTS

| | | | |
|---|---|---|---|
| 0459344 | 12/1991 | European Pat. Off. | ......... H04Q 7/04 |
| 0739148 | 4/1992 | European Pat. Off. | ......... H04Q 7/32 |
| 0767426 | 4/1997 | European Pat. Off. | ......... G06F 9/455 |
| WO9220167 | 11/1992 | WIPO | ............................. H04B 1/38 |

OTHER PUBLICATIONS

International Search Report for PCT/US98/13047 dated Oct. 28, 1998.

*Primary Examiner*—Dwayne D. Bost
*Assistant Examiner*—Raymond B. Persino
*Attorney, Agent, or Firm*—David C. Hall; Kevin A. Sembrat

[57] ABSTRACT

An electronic device has a microprocessor operable in a plurality of modes including a memory update mode, a nonvolatile memory and a wireless communication interface for receiving data over a wireless communication channel. In one embodiment, the electronic device includes a wake-up or timer circuit for automatically placing the electronic device in a wireless memory update mode. Data received by said wireless communication interface is stored in the non-volatile memory by the microprocessor in response to receipt of the data while the microprocessor is in memory update mode. A programming unit for transmitting update data has a microprocessor, a wireless communication interface and a memory containing update data. A communication path is established between the programming unit and the electronic device. A system for updating data stored in a nonvolatile memory of a plurality of electronic devices includes a programming unit and a plurality of electronic devices. A method of updating data stored in the nonvolatile memories of a plurality of electronic devices includes placing a programming unit in proximity to the plurality of electronic devices and activating a wireless update routine in the programming unit.

12 Claims, 17 Drawing Sheets

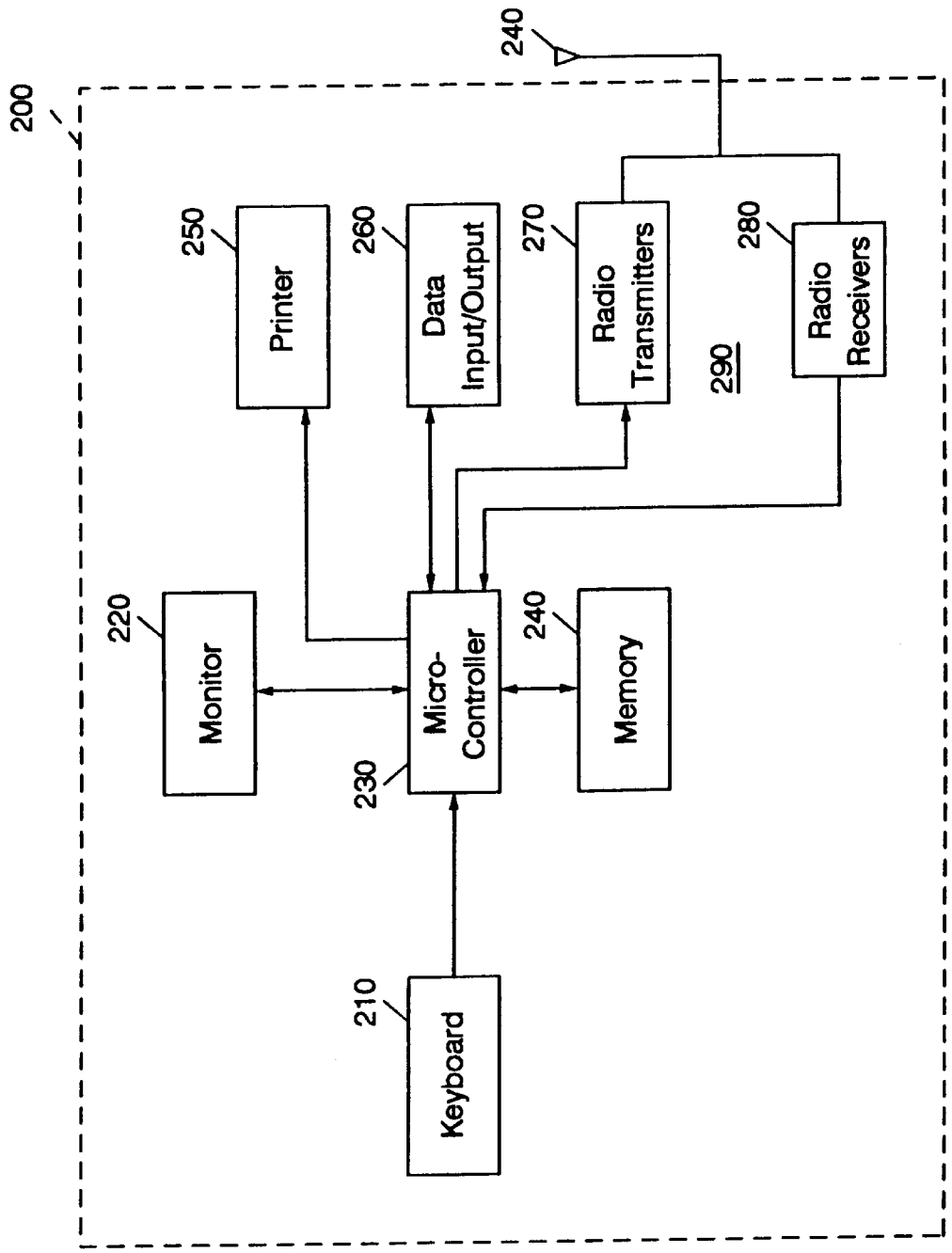

FIG. 4A
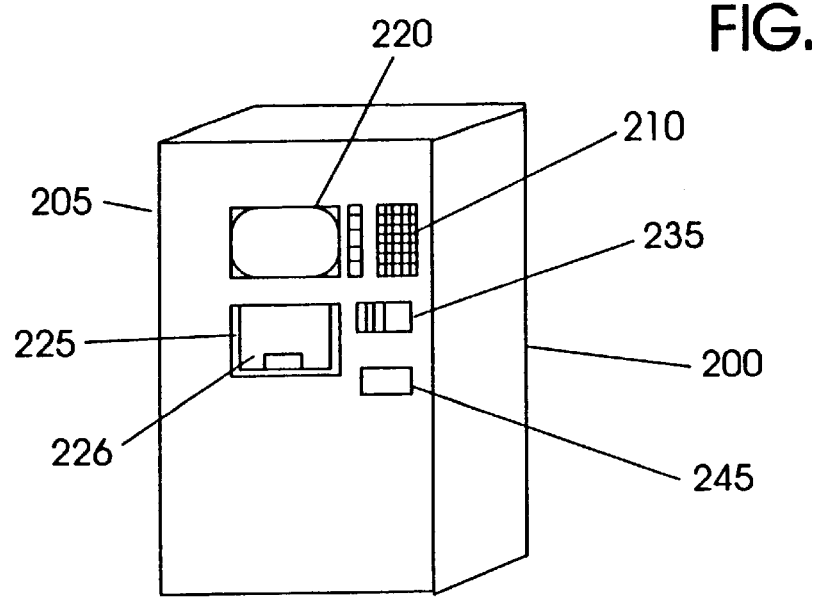
FIG. 4B
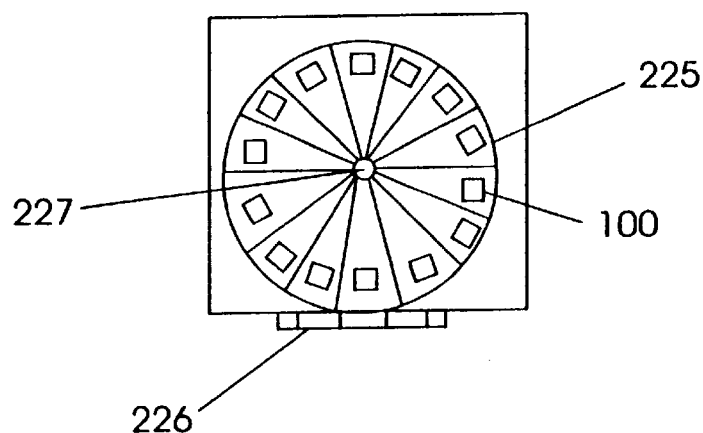
FIG. 4C
| Name | Model | Status |
|------|-------|--------|
| Smith | AF138 | Finished |
| Jones | GH323 | In Process |
| Black | GH400 | Error |

Notification Channel Frame Structure

Data Channel Frame Structure

Acknowledgement Channel Data Flow

Authentication Channel

From Phones to Programmer

From Programmer to Phones

Acknowledgement Channel

From Phones to Programmer

From Programmer to Phones

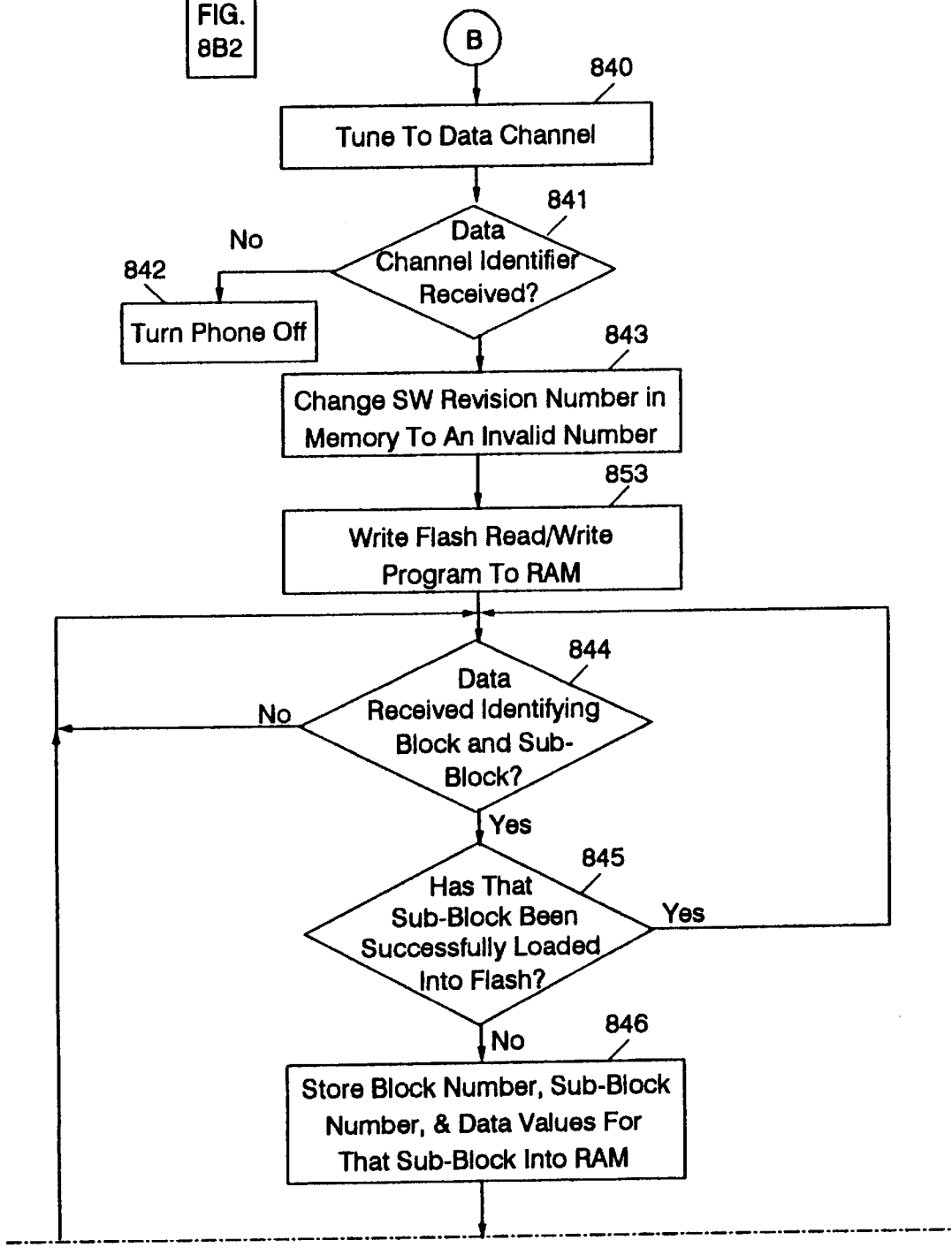

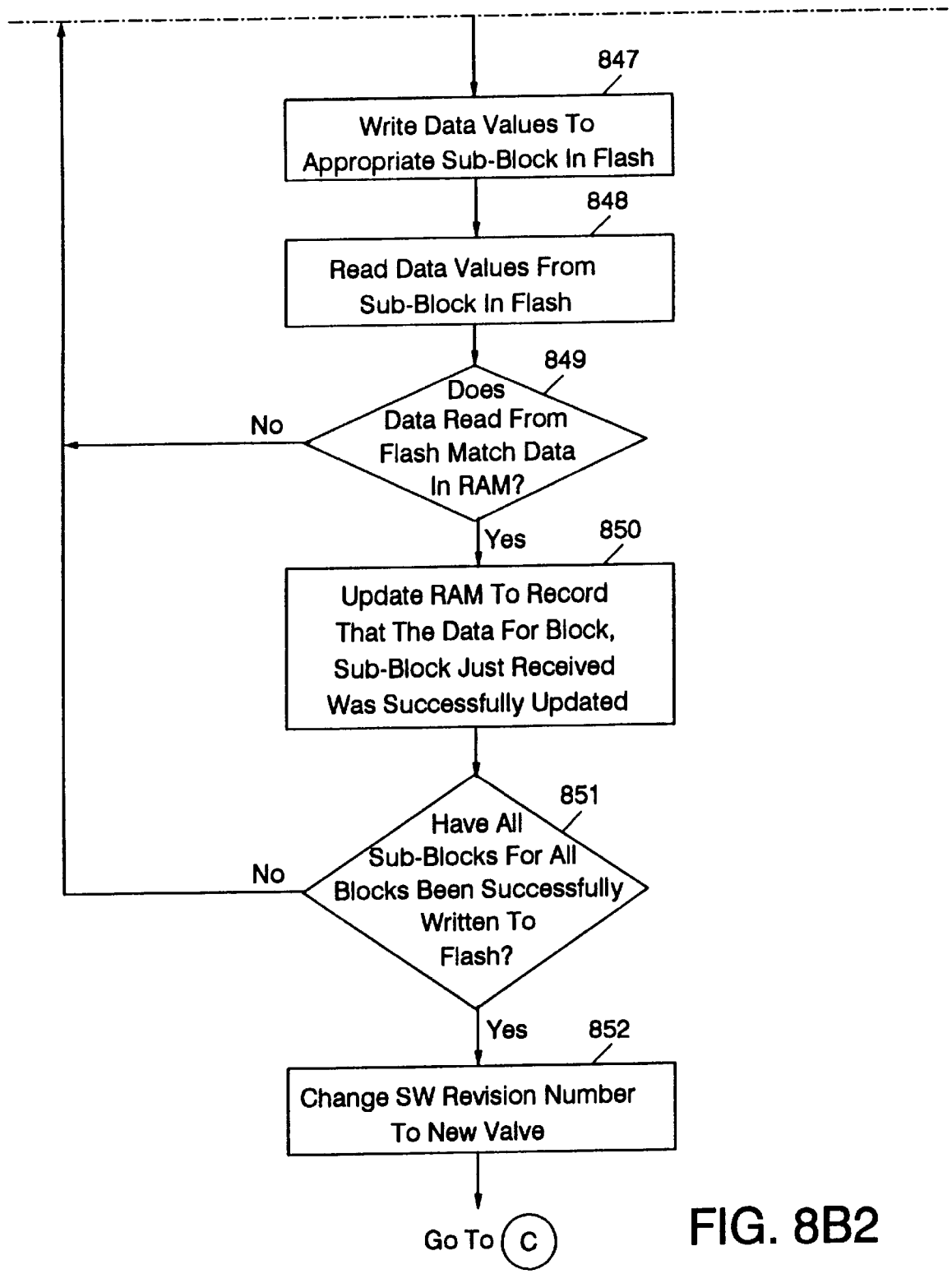
FIG. 8B2

SYSTEM AND METHOD FOR UPDATING A MEMORY IN AN ELECTRONIC DEVICE VIA WIRELESS DATA TRANSFER

BACKGROUND OF THE INVENTION

1. Field of the Invention

The current invention relates generally to wireless telecommunications devices and, in particular, to an automated and wireless method for loading data into electronic devices which have a wireless interface.

2. Description of the Related Art

Modern cellular telephones contain a microcontroller and other circuits which perform various functions such as controlling radio circuits, providing a user interface and user features through interaction with a display, keypad and other phone elements, minimizing power consumption to extend talk and standby times, controlling battery charging, and many other functions. A software program executed by the microcontroller is stored in a non-volatile memory device in the phone, which retains data even when no power is applied to the memory. In some phone designs, this memory is a "read only memory", or ROM. The data content of a ROM is determined when the ROM is manufactured. Once the manufacturing process for a ROM is complete, the data content of the ROM cannot be changed. In other phone designs, a "flash" memory is used. The data content of a flash memory can be altered electronically.

Due to the complexity of cellular telephones, manufactured phones sometimes contain errors in the microcontroller software. Additionally, customers often desire updated software for existing phones to obtain new or enhanced features. In either case, the software program for the microcontroller must be changed in phones which have completed and passed all manufacturing steps. If the phone uses a ROM to store the program, the phone must be disassembled and the ROM module must be replaced with a new module containing the desired changes. If the phone uses a flash memory to store the program, in order to update the memory the phone must be physically connected to a device capable of loading, or "flashing" new content into the memory.

In some situations, it is necessary to re-program phones which have been assembled and packaged, but which have not yet been shipped to customers. For this case, the completed phones reside in the manufacturer's warehouse or distribution center. In other situations, changes must be made to phones already received by the customer. In such a case, the customer normally returns the phones to the manufacturer for re-programming.

Altering program data in phones which use a ROM is very labor intensive, due to the need to unpack the phone (from the shipping package), disassemble the phone, remove the old ROM, install the new ROM, re-assemble the phone, test and re-pack the phone. For phones that contain a flash memory, the program can be changed by connecting a cable from a programming device to the phone, thereby eliminating the need to physically replace the memory module. However, the labor required is still quite substantial because the phone must be unpacked, updated, tested and re-packed.

Thus, a costly problem exists for cellular phone manufacturers with regard to software design and software changes. The cellular telephone market demands ever-increasing functionality and feature content (most of which is provided by the software), decreasing costs and shorter time to market. These demands increase the likelihood of software errors and customer requests for software changes in existing products. However, the labor required to modify the software in phones (even those with flash memories) makes these changes very costly.

Changes to the data content of non-volatile memories within cellular phones is not always confined to the microcontroller software. For example, a need may arise to change a factory setting (stored as a digital value within the memory), to correct date codes or other data related to manufacturing information, or to load data to activate a phone. The problems identified for changing the software content of a phone also apply to other types of data stored within the non-volatile memories.

Moreover, the problem of memory updating is not restricted to cellular telephones, but is common to any electronic device having data or programs stored in a nonvolatile memory.

SUMMARY OF THE INVENTION

An electronic device has a wireless communication interface including an RF transceiver, a microprocessor and an associated non-volatile memory (hereinafter referred to as a "flash" memory). The data content of the nonvolatile memory is partitioned into blocks. Each block can be re-programmed independently of each other block. The device also includes a timer circuit coupled to a battery. The timer circuit is operable to "wake up", or power the device at predetermined intervals (for example, once per day).

When the device is awakened by the timer, the microprocessor causes the RF unit to scan one or more predetermined channels in search of a carrier modulated with data. If a carrier is found and the modulation technique, data rate, data content, etc. of the received signal meet predetermined requirements, the electronic device examines the data conveyed by the RF carrier and uses the data to re-program specified blocks of the memory.

A second device, referred to herein as a "wireless programmer" or "programming unit", generates a signal for re-programming the memory of an electronic device, and receives and processes confirmation signals from the electronic device. The wireless programmer (which may be a specially configured personal computer) includes a central processing unit, memory, RF transceiver, antenna and various data input/output means (such as a keypad, monitor, modem, touch screen display, mouse, bar code reader, etc.). The transceiver is used to establish a two-way data link with the electronic device to be programmed. The wireless programmer stores the updated software, revision number of the updated software, and (at the end of the re-programming process) a list of electronic devices by serial number which have been successfully re-programmed, and their corresponding software revision levels.

In one embodiment, the data communication method between the wireless programmer and the electronic device is secured by using an authentication process to prevent accidental or unauthorized re-programming.

A method of reprogramming an electronic device includes the steps of loading the wireless programmer with appropriate data, including updated software or data, revision levels and a list of electronic devices to be updated, by serial number, placing the wireless programmer in proximity to the electronic device and turning the wireless programmer on for a period of time, and automatically updating the memory of the electronic device.

Once programming is complete, a list of serial numbers of electronic devices which have been successfully updated may be obtained from the wireless programmer. The same method can be used for devices returned from the field.

In one embodiment, the wireless programmer is constructed as a kiosk which may be placed in a public area such as a cellular phone showroom. The kiosk has a user interface including a touch screen monitor and a credit card reader, and a compartment for depositing an electronic device to be updated. The user may use the touch screen monitor to select upgrade features to be added to his cellular telephone and place the cellular telephone into the compartment, where the memory of the telephone is updated automatically and wirelessly. In one embodiment, the telephone compartment is a multi-compartmented container capable of holding a number of different phones simultaneously.

Although the re-programming method described above is related to changing the software in an electronic device, it may also be used to change the content of data fields in the device corresponding to user settings (such as personal identification codes and emergency numbers) or manufacturing date codes, or to activate the device.

BRIEF DESCRIPTION OF THE DRAWINGS

FIG. 4 is a block diagram of a wireless programmer.

FIG. 4A shows a wireless programmer embodied as a standalone kiosk.

FIG. 4B shows an internal structure of a wireless programmer/kiosk.

FIG. 4C shows an exemplary screen display of a wireless programmer/kiosk.

FIGS. 8, 8A, 8B, 8B1, 8B2 and 8C are flowcharts which illustrate the logical operation of an electronic device.

DETAILED DESCRIPTION OF THE DRAWINGS

A system and method for wireless re-programming of memories in electronic devices is described, wherein an electronic device establishes a wireless, bidirectional data communication path with a wireless programming device. The wireless programming device is referred to herein as a "wireless programmer."

In this specification, communication paths between the electronic device and the wireless programmer are referred to as "channels" which may be implemented using any one of a number of physical or logical wireless data communication techniques. For example, the communication paths may based upon a frequency division multiplexing system (such as AMPS) whereby one carrier per channel is modulated with data on a continuous basis. Alternatively, a time division multiple access (TDMA) system may be used, such as those described in the D-AMPS, GSM or IS-136 standards. In a TDMA system, a channel is associated with a specific time slot on a single RF carrier frequency. Data for a specific receiver may be sent in one of several time slots, while other time slots may be used on the same carrier for other receivers.

The wireless link could implement a short-range RF communication protocol such as MC-Link. Moreover, the wireless link could comprise a channel other than an RF channel, such as an infrared channel or magnetic coupling.

In still other systems such as code division multiple access (CDMA) systems, data may be conveyed to several receivers using only one carrier, with the data directed to a specific receiver through modulation with a unique spreading code. The particular communication format or standard used is not critical to the present invention. Other wireless communication techniques may be employed by those skilled in the art to implement the present invention without departing from the spirit or scope of the invention.

Wireless data communication methods typically employ means for bit and byte synchronization, error detection or correction, interleaving, etc. to ensure a reliable communication link. Such techniques are well known in the art and are described, for example, in the IS-54, and IS-136 Standards published by Telecommunications Industry Association. The system of the present invention may be advantageously implemented using a communication scheme which supports such features.

Figure 1:
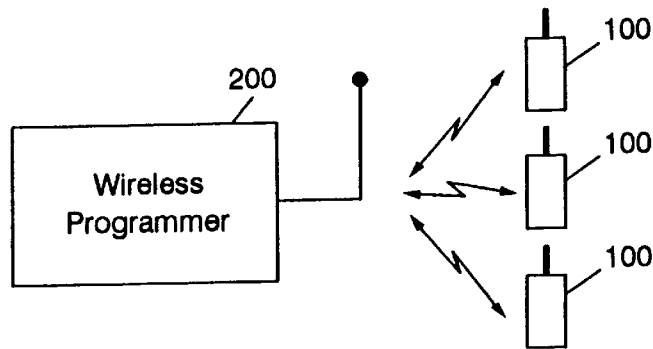
FIG. 1 is a block diagram of a wireless system consisting of a wireless programmer and one or more electronic devices.

Referring now to the accompanying drawings, FIG. 1 illustrates a system which includes a wireless programmer 200 and one or more electronic devices 100. While the wireless programmer 200 is operating within range of the electronic devices 100, wireless communication paths are established with each electronic device 100 when the devices 100 are placed in memory update mode. Timers within each device 100 may be employed to automatically turn the device 100 on and place the device in memory update mode, or the device may be placed in memory update mode by means of a physical or software selectable switch. If certain conditions are satisfied as described in detail below, the memory content of the device 100 will be altered as a result of the communication between the device 100 and the wireless programmer 200.

The system and method described herein is particularly advantageous for a number of applications. The first is in reprogramming the memories of devices which have been manufactured and packaged, but which for some reason contain errors in their stored program code or which contain an operational parameter that is incorrect or otherwise needs to be changed. A wireless programmer 200 is placed in proximity to a group of devices to be updated and a wireless update routine or program is commenced within the wireless programmer 200. The wireless programmer then begins to continuously broadcast update information. As each device 100 automatically powers on and is placed in memory update mode, it searches for a wireless communication channel containing update information. Once the communication channel is found, the wireless device 100 receives the update information and stores it in nonvolatile memory. The wireless device then powers down. As the wireless programmer is transmitting update information to the wireless devices 100, the wireless programmer is also receiving acknowledgement signals from the devices 100 which have been successfully updated. In this manner, the wireless programmer 200 can maintain a record of which devices 100 have been successfully updated. Thus, a batch of devices may be updated without having to unpack and repack each device.

In another embodiment, the system of the present invention may be used to efficiently and easily update the memory of the device 100 which has already been distributed to an end user. For example, an end user wishing to upgrade the software in his device may return the device 100 to the manufacturer or dealer, who then updates the device using the methods described herein.

Yet another application of the present invention is in a standalone kiosk, such as is commonly found in retail establishments. When a wireless programmer 200 is configured as a kiosk, as is described in more detail below, the wireless programmer 200 may be operated by the user to quickly and efficiently update or upgrade the device, eliminating the need for the user to send the device back to the manufacturer or distributor.

Other uses and applications of the present invention will be apparent to those skilled in the art seeking improved methods of updating memories in electronic devices.

Wireless Electronic Device Configuration

Figure 2:
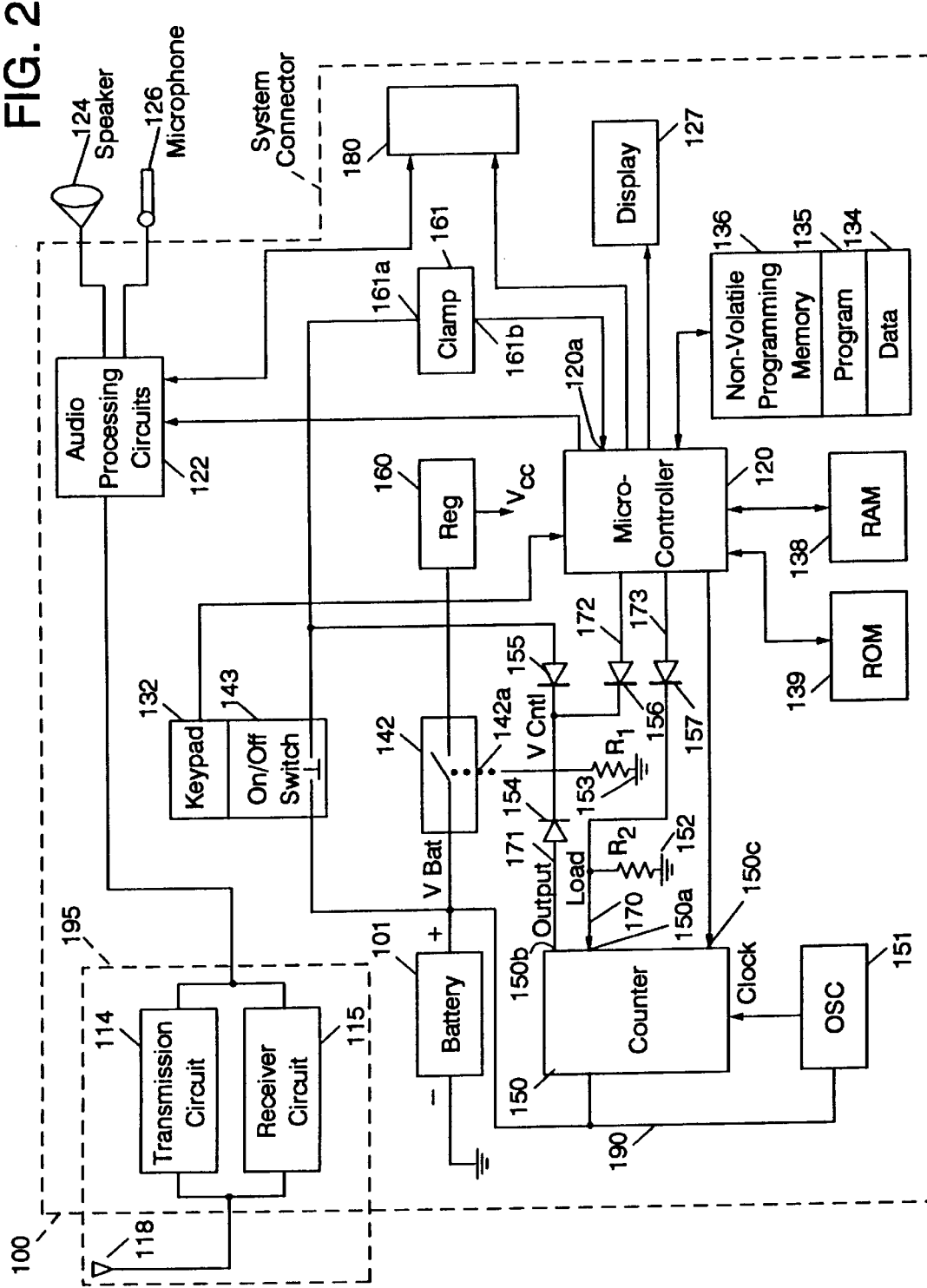
FIG. 2 is a block diagram of an electronic device.

FIG. 2 illustrates a block diagram of the electronic device 100 according to the present invention. In a preferred embodiment, the electronic device 100 is a cellular telephone. The principles of the present invention are particularly suited for use in updating memories in small hand-held portable telephones. However, the present invention may be used to update the memory of any type of electronic device which contains an electrically alterable memory and a wireless communication interface, such as a pager or a laptop computer equipped with a wireless modem.

An electronic device 100 of the present invention includes a wireless communication interface 195. In the embodiment illustrated in FIG. 2, wireless communication interface 195 includes an RF transceiver having a transmitter 114 and a receiver 115 which are coupled to a common antenna 118. The transmitter and receiver circuits 114, 115 are controlled by a microcontroller 120 that may be one of a variety of commonly available microcontrollers. In other embodiments, wireless communication interface 195 may include an infrared communication unit or other wireless communication device.

Audio signals for transmission or audio signals that have been received pass through the audio processing circuit 122. Audio processing circuit 122 converts the received audio signals to signals suitable for broadcast over speaker 124 and converts the electrical signals from the microphone 126 to signals suitable for transmission by transmitter circuit 114.

The microcontroller 120 also controls the display 127 for the device 100 and receives input signals from the keypad 132. System connector 180 provides an electrical interface which is used by electronic device 100 to input or output data and/or other signals. System connector 180 can be used to update the memory in the device using standard, wire-based methods, as are well known in the art.

Nonvolatile memory 136, which is capable of storing data even if power is not applied to the memory, may include an electrically erasable programmable read only memory (EEPROM) module, a static ram (SRAM) module with battery backup, or any other type of nonvolatile digital memory. Moreover, nonvolatile memory 136 could comprise any other type of nonvolatile digital storage means, such as a magnetic disk or tape.

In an exemplary embodiment shown in FIG. 2, nonvolatile memory 136 comprises an EEPROM module. A software program resides in area 135 of memory 136, while data resides in area 134. Microcontroller 120 can fetch and execute instructions which reside in memory 136. Furthermore, the memory contents can be altered either on a byte-by-byte basis, or in blocks of bytes.

Figure 3:
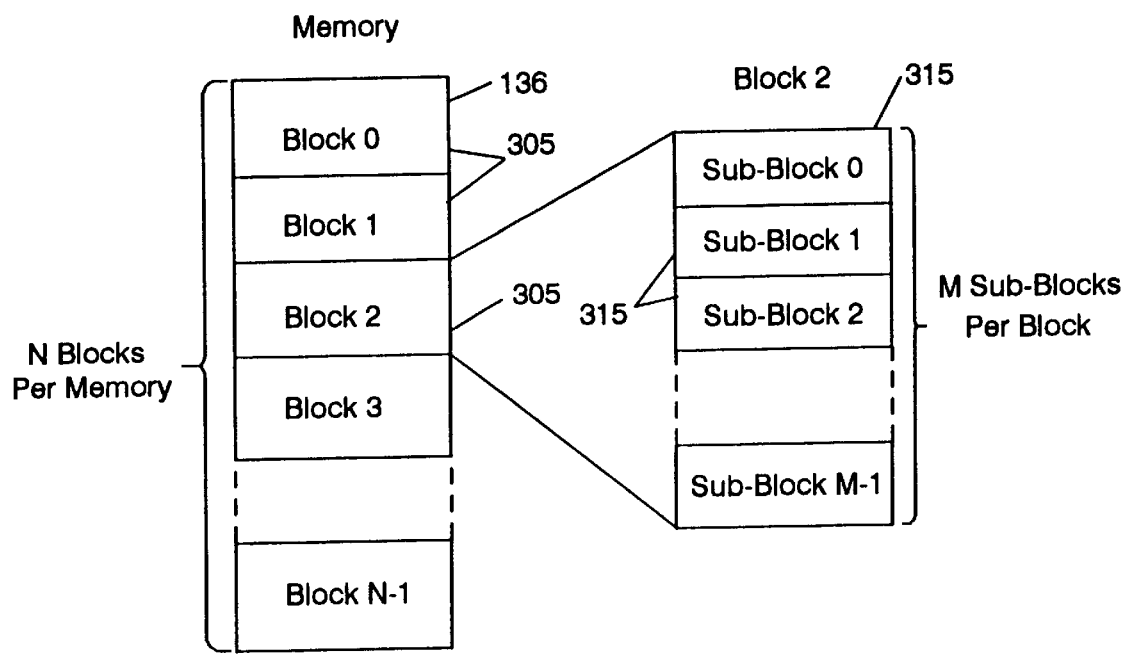
FIG. 3 illustrates how data is organized in the memory of the electronic device.

Referring to FIG. 3, a memory partitioning arrangement for the embodiment where the contents of memory 136 can be altered in blocks is illustrated. Memory 136 is logically divided into a plurality of N blocks 305, each of which can be altered without disturbing other blocks of the memory. Given that each block of data may include a large number of bytes, each block 305 may be further divided logically into sub-blocks 315 to facilitate re-writing the data contents. The use of sub-blocks 315 for memory updating is described in greater detail below. Blocks 305 may be individually numbered for reference or may be identified by their respective hexadecimal addresses in memory.

In the case where electronic device 100 is a cellular telephone, nonvolatile memory 136 additionally stores a number of operating parameters and user settings for the device 100. Among the stored parameters is a 32-bit binary Electronic Serial Number (ESN). In a typical cellular telephone system, each cellular telephone has a unique ESN which is used to identify the particular cellular telephone and its manufacturer.

Referring again to FIG. 2, electronic device 100 additionally includes a random access memory (RAM) 138. The data content of RAM 138 is volatile. That is, the contents of RAM 138 are lost if power ceases to be applied to RAM 138. RAM 138 is used to store temporary data values, and can also be used to store a software program for execution by microcontroller 120.

Electrical current required to operate the components of electronic device 100 is provided by a battery 101. The battery 101 is connected to most components of the device 100 via a switch 142. A regulator 160 connected to the battery through switch 142 provides a constant voltage (Vcc) to the other electrical components in the device, except for a wake-up circuit 190. When switch 142 is open, the battery 101 is disconnected from most of the circuits within the device, with the exception of the wake-up circuit 190 (which is always coupled to the battery 101).

Wake-Up Circuit Operation

The wake-up circuit 190 will now be described with reference to FIG. 2. For the following circuit description, "set" or "high" refers to a logic level that is the higher of two valid digital output states, "reset" or "low" refers to a logic level that is the lower of two valid digital output states.

Wake-up circuit 190 includes a counter 150, oscillator 151, resistors 152 and 153 and diodes 154, 155, 156 and 157. Oscillator 151 provides a clock signal for counter 150. Counter 150 has a clock input, a load input 150a and an output 150b. The design of digital counters such as counter 150 is very well known in the art. Counter 150 is loaded with a counter initialization value when the load input line is strobed. The counter initialization value may be hard wired into counter 150, or it may be loaded at data input 150c by microcontroller 120.

Each clock pulse received from oscillator 151 causes the counter value to decrease by one. When the counter value equals zero, two actions occur: first, clock pulses from the oscillator are inhibited from clocking the counter, thereby stopping the counting process; and second, the counter output 150b is set. The counter output 150b is reset for any non-zero counter value.

When the load input 150a is high, the counting process is inhibited and the counter is loaded with a non-zero value (the counter initialization value). Counter 150 operates (counts) when the load input 150a is low and the counter value is not equal to zero. After the load input 150a changes from high to low, the time required for the counter value to reach zero is based upon the actual value loaded into the counter and the oscillation frequency of the oscillator 151. In practice, these values will be selected to produce a desired wake-up interval. For example, if the desired wake-up interval is every 24 hours and the oscillator frequency is 1 kHz, then the counter initialization value will be 86,400,000.

The desired wake-up interval may be a factory set default value, such as 24 hours, or may be modified by the user by means of a menu selection. For example, if the user knows that the device 100 is to be updated, he can select "Memory Update Mode" from a configuration menu, (not shown) the effect of which is to select a very short wake-up interval (and correspondingly load the counter 150 with a small initialization value). Once the device 100 has been updated, the user can return the device to its normal operating mode.

In another embodiment, the wake-up interval is initally factory set at 24 hours to permit wireless updating of the device at a factory or distribution center if necessary. After a predetermined period (such as one month, for example) the wireless update feature will be disabled automatically. Then, if the device needs to be updated at a later date, it can be placed into Memory Update Mode manually by the user or a technician. In yet another embodiment, after an event such as activation, the update feature is disabled automatically. In still another embodiment, the device 100 may be placed directly into Memory Update Mode by means of a menu or function selection or a switch.

Diodes 154, 155, 156 and resistor 153 are used to create a "logical OR" function for controlling switch 142. Whenever the anode of any of these diodes is high, the control voltage to switch 142 is high, causing switch 142 to close. Diodes 156 and 157 prevent potentially damaging voltage from being applied to microcontroller 120 outputs when no power is applied to the microcontroller 120.

Device 100 also includes a switch 143 and a clamp 161 for enabling the user to power the device 100 on and off. Switch 143 is a normally open, momentary contact switch which is activated by the user to turn the device 100 on and off. Clamp 161 has an input 161a and an output 161b. Clamp 161, the design of which is well known in the art, has the following characteristics: The output voltage of the clamp is equal to the input voltage for all input voltages between 0 volts and Vcc volts. The output voltage equals Vcc volts whenever the input voltage is greater than Vcc. Clamp 161 prevents damage to the microcontroller 120 by preventing voltages in excess of Vcc from being applied to the microcontroller. Input 161 a of clamp 161 is coupled to switch 143. Output 161b of clamp 161 is coupled to input 120a of microcontroller 120.

When the device 100 is first powered on, the microcontroller 120 determines whether the device was powered on by the user or by the timer circuit 190 by testing the output voltage of clamp 161. If the clamp 161 output voltage is high, then switch 143 was closed, indicating that the device 100 was powered on by the user. If the clamp 161 output voltage is low, the device 100 was powered on by the operation of timer circuit 190.

While the device 100 is on, the microcontroller output to diode 157 is set, thereby setting the counter load input 150a. While the load input 150a is set (which, for this case, is the duration of time the phone is on), the counter 150 is inhibited from counting and is loaded with the initialization value, as described above.

When power is removed from microcontroller 120, the input to diode 157 becomes low, resetting the load input 150a to counter 150. This enables the counter 150 to operate, counting down from the initialization value loaded into the counter 150 when the load input 150a was set.

As described above, while the device 100 is in a powered off-state, the counter 150 counts down to zero from the counter initialization value. (This occurs because the test circuit 190 is powered directly from the battery 101 and the load input 150a to the counter 150 is low). When counter 150 reaches a count value of 0, the counting process stops and the counter output 150b is set. With the output 150b set, voltage is applied to the control input 142a of switch 142 through diode 154, causing switch 142 to close. This applies battery voltage to regulator 160 which applies power to the microcontroller 120.

When microcontroller 120 begins instruction execution, it first tests the clamp output 161 b to determine if switch 143 is closed (indicating power-up caused by user input). In this example, switch 143 will not be closed because the phone was turned on by the wake-up circuit 190. Microcontroller 120 then sets the output to diode 156, which provides a second source of current for resistor 153. This action latches device 100 in an "on" state. As long as output 172 remains high, the state of switch 143 or counter output has no effect on switch 142.

The action by the wake-up circuit 190 to turn the device 100 on places the device in a memory update mode (as opposed to a normal mode of operation which occurs when the device is turned-on by the user). In memory update mode, program execution branches to a group of instructions which provide functionality required to perform wireless transfer of data to the phone.

In one embodiment, if the user attempts to turn the phone on while a counter initiated power-up has occurred, the user input is ignored by microcontroller 120 until all memory re-programming processing is complete.

Wireless Programmer Configuration

FIG. 4 illustrates a block diagram of a wireless programmer 200. The wireless programmer 200 communicates with one or more electronic devices 100 via a wireless link to load binary data and/or program code into the devices 100. Wireless programmer 200 includes a microcontroller 230, a memory 240, and an RF unit 290. Wireless programmer 200 may include a number of input/output devices such as a keyboard 210, a monitor 220, and a printer 250. Wireless programmer 200 also includes a data I/O unit 260 which may connect other I/O devices such as a touch screen, modem and bar code reader, for example.

RF Unit 290 includes at least one radio transmitter 270, at least one radio receiver 280 and an antenna 240.

The keyboard 210 allows a user to input data and commands. The monitor 220 and printer 250 allow the user to receive information from the programmer. Data and software programs are stored in the memory 240, which may include but are not necessarily limited to RAM, ROM, hard or floppy discs. Data input/output devices are used load the programmer 200 with programs, files and data. The radio transmitter 270 and receiver 280 are linked to antenna 240 and use one or more communication paths to exchange data with electronic devices 100. All operations of the wireless programmer 200 are controlled by microcontroller 230.

Wireless programmer 200 is provided with a set of programmed instructions stored in memory 240 which comprise a program referred to herein as a "wireless update routine" or "wireless update program" which controls the logical operation of wireless programmer 200.

In one embodiment illustrated in FIG. 4A, the wireless programmer 200 is constructed as a kiosk 205 which may be placed in a public area such as a cellular phone showroom. The kiosk 205 has a user interface including a touch screen monitor 220, a credit card reader 235, and a bar code scanner 245. Kiosk 205 also has a compartment 225 for receiving the electronic device 100 to be updated. Compartment 225 is covered by a door 226. In one embodiment, the compartment 225 is a multi-compartmented container capable of holding a number of different phones simultaneously. For example, FIG. 4B illustrates a cross-sectional view of kiosk 205 containing a multi-compartmented carousel 225 accessible via a door 226. Multiple devices 100 may be contained within carousel 225 and updated simultaneously. Carousel 225 rotates about an axis 227 to permit deposit and removal of a particular device 100 through door 226. The status of the wireless programmer 200's operation is displayed on monitor 220. An exemplary screen display of monitor 220 is shown in FIG. 4C, which shows the current status of three concurrent wireless update procedures.

Channel Definitions and Operation

Figure 5A:
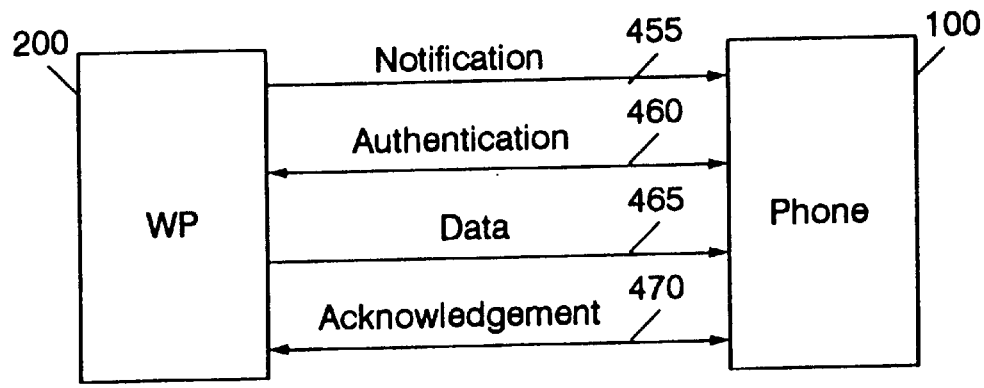
FIG. 5A is a block diagram showing an arrangement of logical channels between a wireless programmer and an electronic device.

In one embodiment, four communication channels are defined for communication between wireless programmer 200 and an electronic device 100. The defined channels, which are illustrated in FIG. 5A, include a Notification Channel 455, an Authentication Channel 460, a Data Channel 465 and an Acknowledgement Channel 470. The structure and operation of these channels are described below.

1. Notification Channel.

The Notification Channel 455 is a one-way communication channel from wireless programmer 200 to device 100. Data is sent continuously on this channel in a plurality of sequential frames. Each frame contains the following fields:

TABLE 1

Notification Channel Frame Structure

| | |
|---|---|
| CIC | Channel Identification Code (identifying the channel as a notification channel). |
| RN | Revision Number of the new software program to be downloaded. |
| LOC | Location (i.e., frequency, time slot, spreading code, etc.) for the 1) Authentication channel, 2) Data channel and 3) Acknowledgment channel. |
| CBN | Changed Block Numbers - list of block numbers of phone memory to be altered. |

Figure 5B:
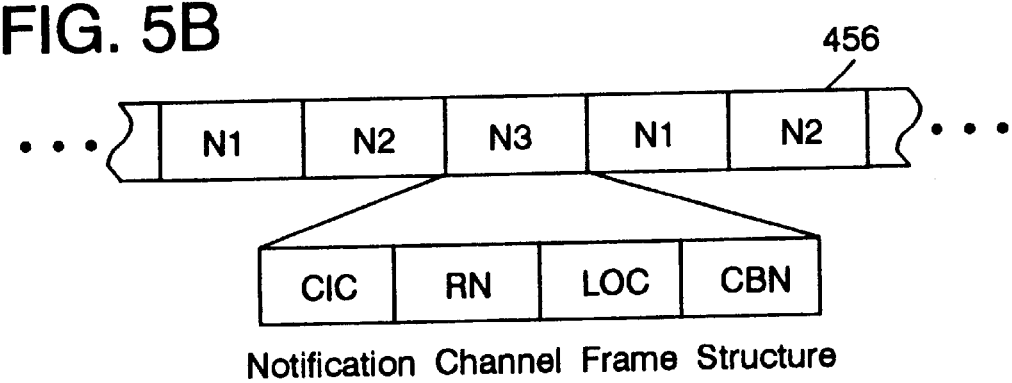
FIG. 5B shows a frame structure for the Notification Channel.

The structure of the Notification Channel 455 is illustrated in FIG. 5B. As illustrated, the wireless programmer 200 continuously transmits a plurality of sequential notification frames $N_i$ 456, each of which may carry unique update notification data. This permits concurrent updating of different electronic devices with different update revision levels. For example, notification frame N1 may carry notification information for updating a first model of cellular telephones to a first revision level, while notification frame N2 carries notification information for updating a second model of cellular telephones to a second revision level, and so forth. The Notification channel frame may additionally include a field containing the electronic serial numbers of all devices to be updated to the software revision level specified in the RN field.

2. Authentication Channel.

Figure 5C:
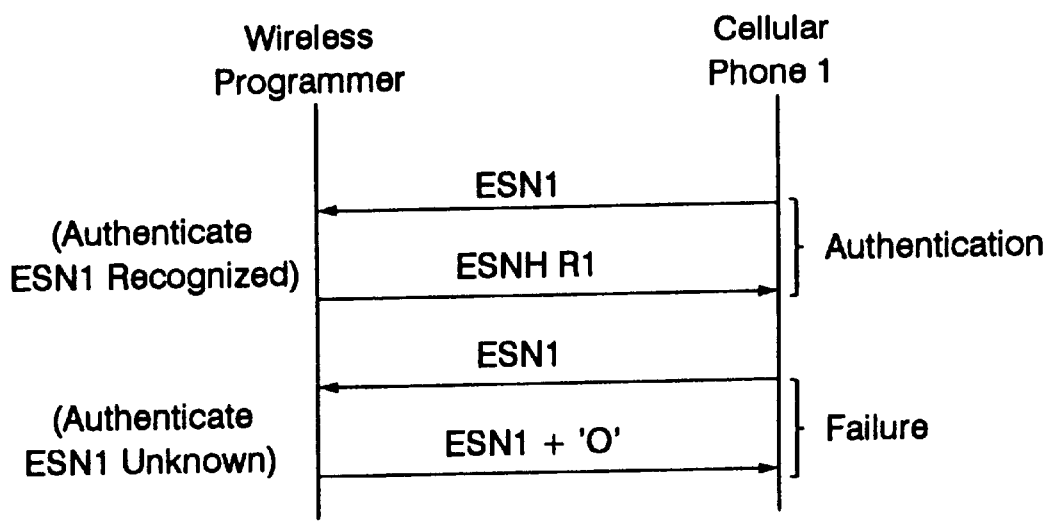
FIG. 5C is a flow diagram showing the flow of information on the Authentication Channel.

The Authentication Channel 460 is a two-way communication channel which provides means for the devices 100 and the wireless programmer 200 to exchange authentication information. Data flow on the Authentication Channel 460 is illustrated in FIG. 5C, and is explained in greater detail below.

3. Data Channel.

The Data Channel 465 is a one-way communication channel from the wireless programmer 200 to electronic device 100. Data is sent continuously on the Data Channel 465 to convey data values for those blocks of memory to be altered. The electronic devices 100 receive data bytes to update all affected blocks within the nonvolatile memory 136. Data transmitted on the data channel is organized into frames having the following fields:

TABLE 2

Data Channel Frame Structure

| | |
|---|---|
| BSS | Block start sequence (pre-determined data sequence to indicate the beginning of data sequence). |
| BN | Block number |
| SBN | Sub-block number |
| DATA | M data bytes |

Figure 5D:
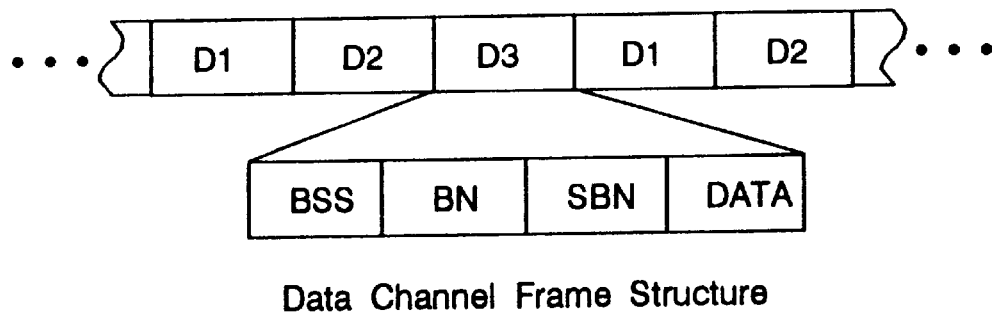
FIG. 5D shows a frame structure for the Data Channel.

The frame structure of a Data Channel 465 is shown in FIG. 5D. As illustrated, wireless programmer 200 continuously transmits a series of data frames $D_i$ 466, each of which comprises each of the fields described in Table 2. Depending on how many updates are being performed concurrently by wireless programmer 200, there may be multiple Data Channels 465 in operation at any one time.

Multiple data frames may be transmitted on any one Data Channel 465. This permits the update of multiple subblocks in a given reprogramming operation. For example if a given reprogramming operation includes updating five memory subblocks in a particular class of devices 100, the Data Channel 465 will carry five data frames D1–D5.

4. Acknowledgement Channel.

Figure 5E:
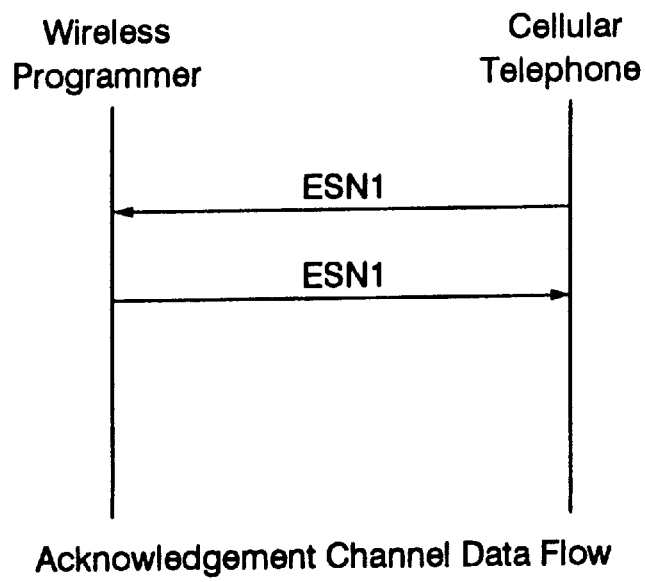
FIG. 5E is a flow diagram showing the flow of information on the Acknowledgement Channel.

The Acknowledgement Channel 470 is a two-way communication channel that provides means for each device 100 to inform the wireless programmer that all memory blocks have been properly updated. Data flow on the Acknowledgement Channel 470 is illustrated in FIG. 5E, and is explained in greater detail below.

As stated above, the Notification channel 455 and Data channel 465 convey data from the wireless programmer 200 to the electronic devices 100; no data is returned to wireless programmer 200 by any device 100 on these channels. The Authentication Channel 460 and Acknowledgement Channel 470 are used to convey data in both directions.

In a preferred embodiment, the RF signal transmitted by the wireless programmer 200 is consistent with the modulation methods, data rates, coding, error detection methods, etc. used by the wireless communication standard for which the device 100 was designed and programmed. This permits the device 100 to be updated in accordance with the present invention with no (or very little) additional modification required.

As will be explained in greater detail below, when the device 100 is placed in the memory update mode, the device 100 searches for the Notification Channel 455. When the Notification Channel 455 is found, the device 100 reads the transmitted information from the Notification Channel 455 and continues the memory update process by proceeding to (i.e., tuning to) the Authentication Channel 460 to perform the authentication procedure. If the device 100 successfully authenticates the wireless programmer 200, it then proceeds to tune to the Data Channel 465 identified in the LOC field of the Notification Channel; if not, the device 100 switches off. Device 100 reads the appropriate information from the Data Channel 465 to update memory. Upon successfully updating memory, the device 100 proceeds to tune to the Acknowledgement Channel 470 to acknowledge successful reprogramming.

Figure 5F:
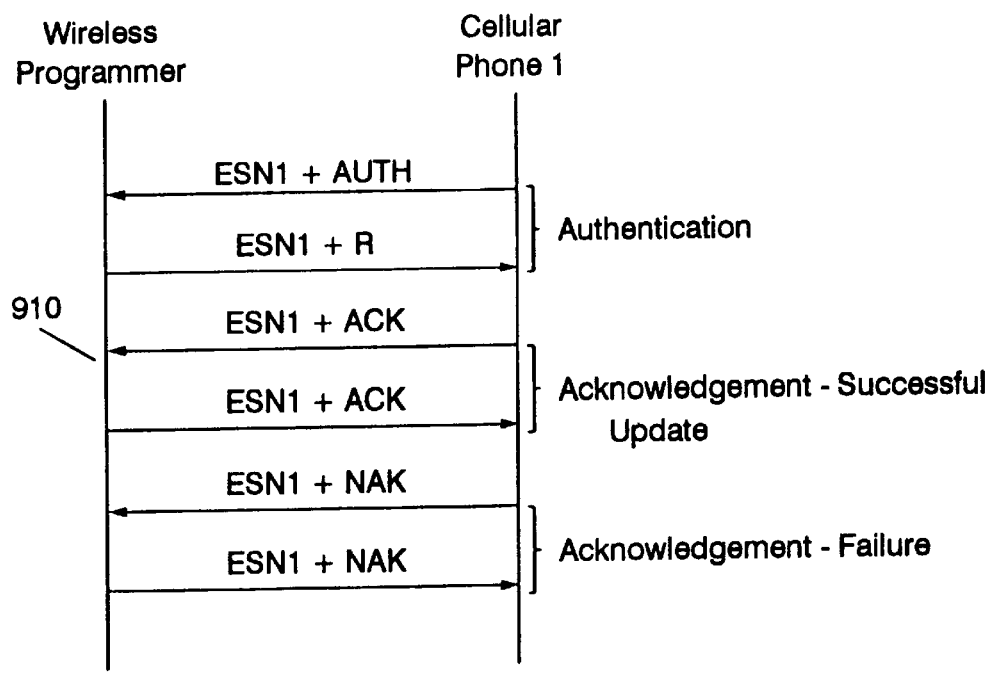
FIG. 5F is a flow diagram showing the flow of information on the Authentication/Acknowledgement Channel in a two-channel embodiment.
Figure 5G:
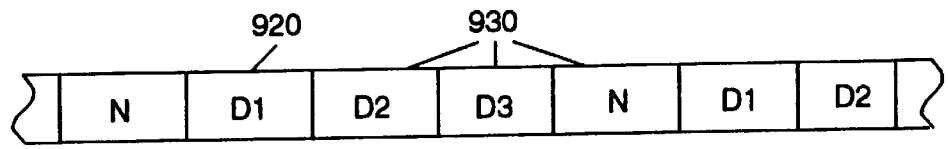
FIG. 5G shows a frame structure for the Notification/Data Channel in a two-channel embodiment.

In another embodiment of the present invention illustrated in FIGS. 5F and 5G, only two channels are defined: a one-way Notification/Data Channel 920, and a two-way Authentication/Acknowledgement Channel 910. Data flow on the Authentication/Acknowledgement Channel 910 is illustrated in FIG. 5F. Each Authentication request by the device 100 comprises the device's ESN plus an Authentication request string AUTH. Upon receipt of an authentication request, the wireless programmer 200 responds with the received ESN plus the caluculated Authentication result R, as described above.

Acknowledgement on the Authentication/Acknowledgement Channel 910 is performed by the device 100 transmitting an acknowledgement signal to the wireless programmer 200 to indicate successful completion of the wireless memory update process. The acknowledgement signal comprises the device's ESN plus an acknowledgement string ACK. The wireless programmer 200 then responds with the same acknowledgement string to confirm acknowledgement. Similarly, to indicate that the update process failed, the device 100 may transmit a failure signal comprising the device's ESN plus a negative acknowledgement string, illustrated in FIG. 5F as NAK.

A number of advantages are obtained by defining various acknowledgement requests and responses. For example, a system implemented in accordance with the present invention may be configured to provide a separate acknowledgement for each subblock of memory successfully updated.

FIG. 5G illustrates the structure of the Notification/Data Channel 920 which is logically divided into a number of frames 930. One frame is a notification frame, while the other frames comprise the data frames. The internal structure of the notification and data frames may be similar to those described above in connection with the four-channel embodiment.

It will be readily apparent to those skilled in the art that many variations on the structure, arrangement and protocol of the various channels used in the wireless update method described herein are possible without departing from the scope of the invention.

Wireless Programmer Logical Operation

Figure 7:
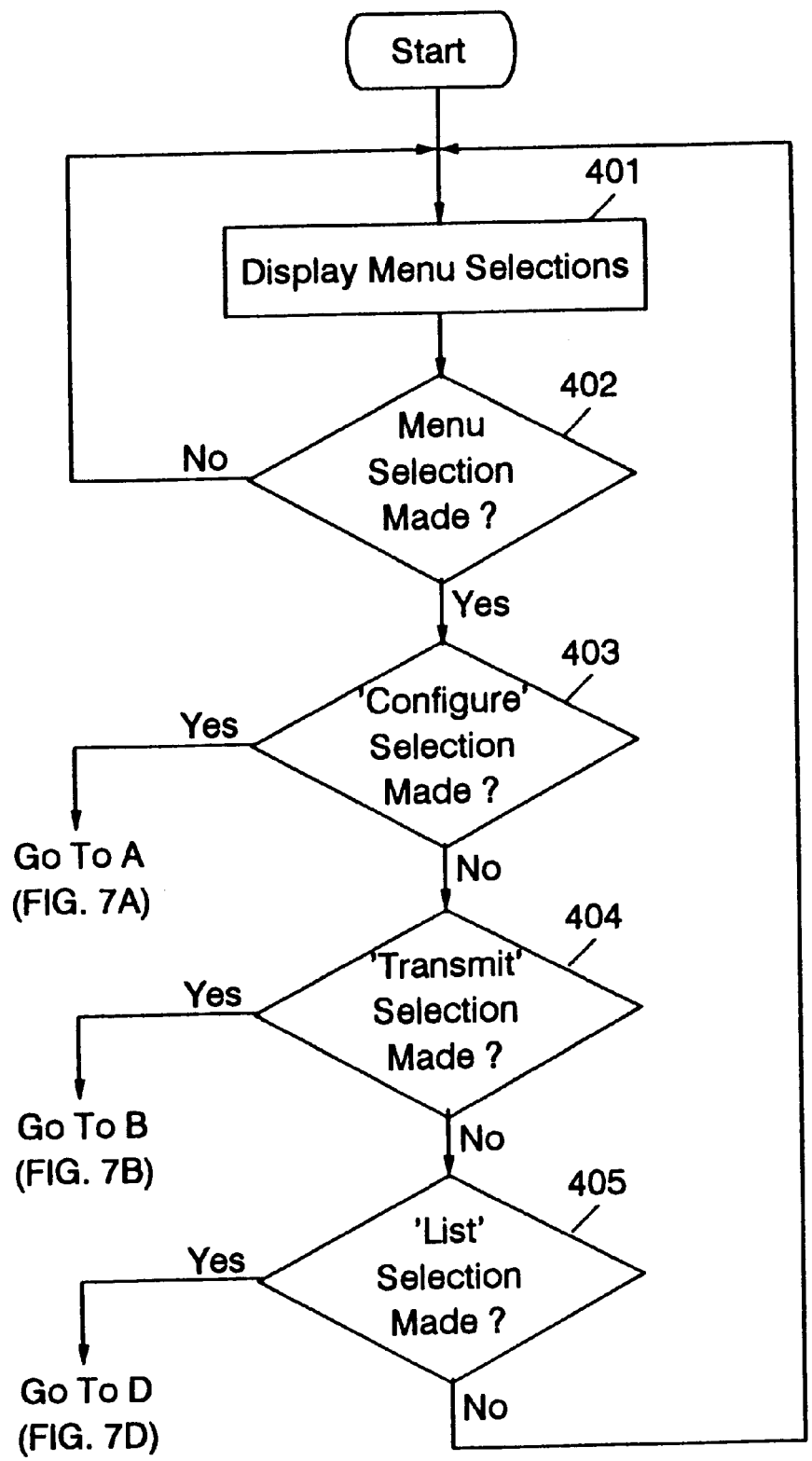
FIGS. 7, 7A, 7B, 7C and 7D are flowcharts which illustrate the logical operation of the wireless programmer.

FIG. 7 (in conjunction with FIGS. 7A, 7B, 7C and 7D) illustrate logical operation of the wireless programmer 200. At the start of execution of the wireless update program, the wireless programmer 200 displays a plurality of menu selections on the monitor 220 in step 401. The menu selection comprises user commands and options for the operation of wireless programmer 200 such as Configure, Transmit, and List. Other commands or options may be included in the menu selection.

If, in step 402, a selection is made, processing continues with step 403. If "Configure" is selected, the program branches to point A (FIG. 7A) in step 403. If "Transmit" is selected, the program branches to point B (FIG. 7B) in step 404. Finally, if "List" is selected, the program branches to point D (FIG. 7D) in step 405. If no valid selection is made, the program branches back to step 401 to redisplay the menu choices and await input.

Figure 7A:
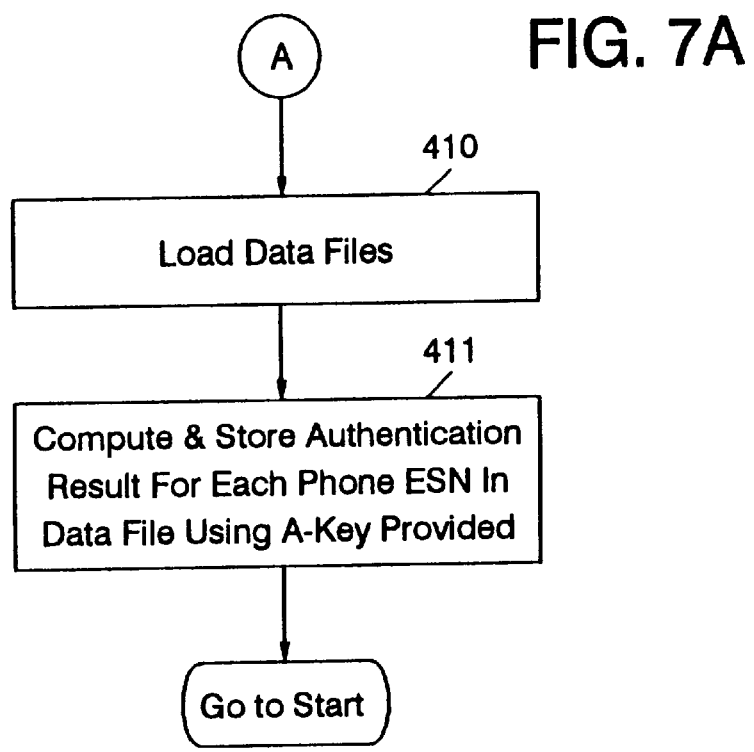

Referring to FIG. 7A, the "configure" selection causes the wireless programmer 200 to load update data and programs into memory in preparation for a programming operation. In step 410 of FIG. 7A, data file(s) are loaded via the data input/output unit 260 (refer to FIG. 4). The data portion of the file(s) transferred may include, without limitation:

1. The serial number of each device 100 to be modified (which in the case of a cellular telephone, may be a 32-bit ESN).
2. A data value for each device 100 for use in an authentication process. The authentication process ensures that devices 100 respond only to memory update signals from a legitimate wireless programmer 200. This data value is called an "Authentication Key" or "A-Key".
3. The software version number of the new software to be loaded into the device 100.
4. A definition of the communication channels to be used to communicate with the device 100.
5. The memory blocks to be updated in each device 100 and the data content of each block.

In step 411, wireless programmer 200 executes an authentication algorithm for each device 100 using the A-key to generate an authentication result R for each device 100. The computed authentication result R for each device 100 is stored in wireless programmer 200. In one embodiment, the device's A-key is used directly as its authentication result. In other cases, a complex algorithm (such as the well-known cave algorithm) may be used to generate the authentication result R from the A-Key. After step 411, the program returns to step 401 of FIG. 7 and redisplays the menu selections.

The "Transmit" selection is used to execute the Transmit routine, which alters the memory contents of devices 100. Operation of the wireless programmer 200 upon selection of the "Transmit" command is described in FIG. 7B.

The menu selections illustrated in FIG. 7 may be used when the wireless programmer 200 is under the control of an operator, for example when the wireless programmer 200 is used to update devices at a manufacturing plant. If the wireless programmer 200 is a kiosk to be used by a consumer, the menu selections should be altered accordingly, for example to permit the user to select a particular option or upgrade, identify his device by serial number, pay for the upgrade using a credit card, etc.

Figure 7D:
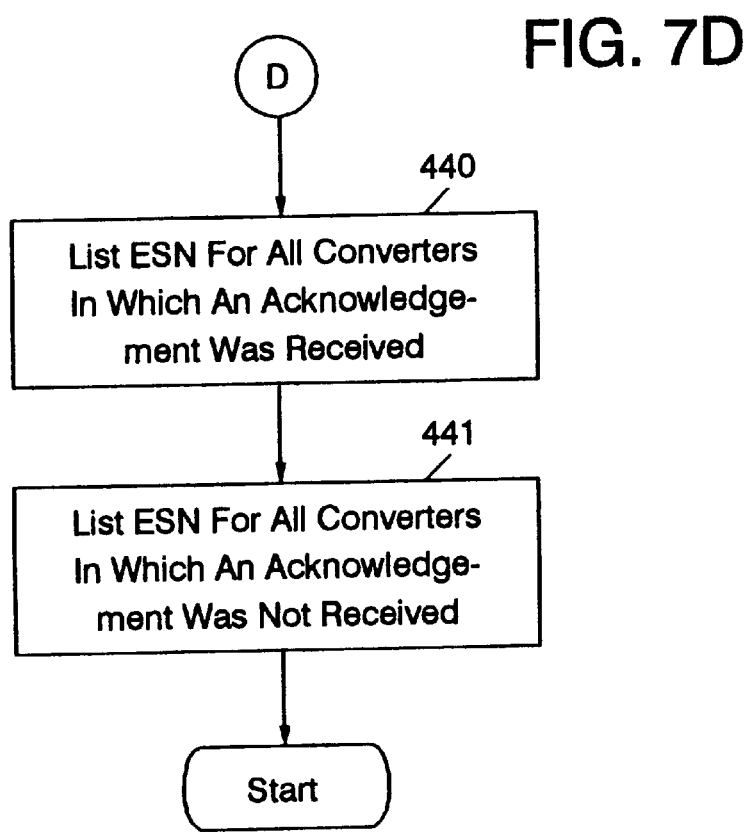
Figure 7B:
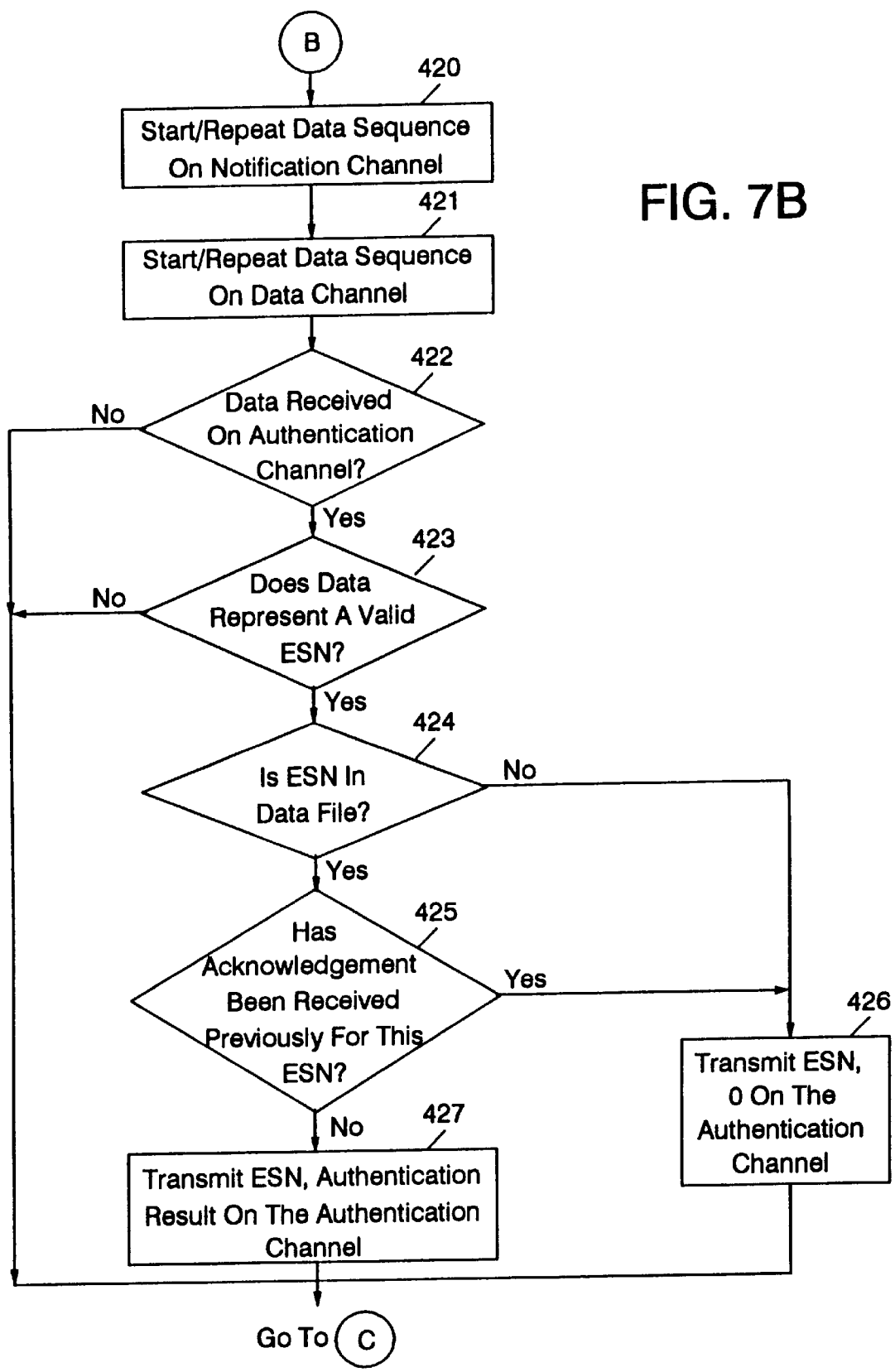

Referring now to FIG. 7B, in step 420, transmission of data on the Notification Channel 455 is initiated, and in step 421, transmission of data on the Data Channel is initiated.

In step 422, wireless programmer 200 determines if data from a device 100 has been received on the Authentication Channel 460. If no data has been received on the Authentication Channel 460, the Transmit routine proceeds to point C of FIG. 7C. If data has been received on the Authentication Channel 460, a test is performed in step 423 to determine if the received data represents a valid ESN. If not, the program jumps to point C of FIG. 7C. If a valid ESN has been received, a test is performed in step 424 to determine if the ESN is in the data file. If not, an authentication string equal to the ESN concatenated with '0' is transmitted on the Authentication Channel 460 in step 426 and then the program proceeds to point C.

If the ESN is in the data file, a test is made in step 425 to determine if an acknowledgement has already been received for the ESN. If so, the device 100 need not continue (since the data has already been altered successfully). Therefore, the program goes to step 426 to transmit a data string equal to the ESN concatenated with '0'. Upon receipt of this data string, the device 100 powers off.

If an acknowledgement has not already been received, then a data string equal to the ESN concatenated with the calculated authentication result R is transmitted.

At point C (step 428 of FIG. 7C), processing by the wireless programmer 200 for the Acknowledgement Channel 470 is carried out.

Figure 7C:
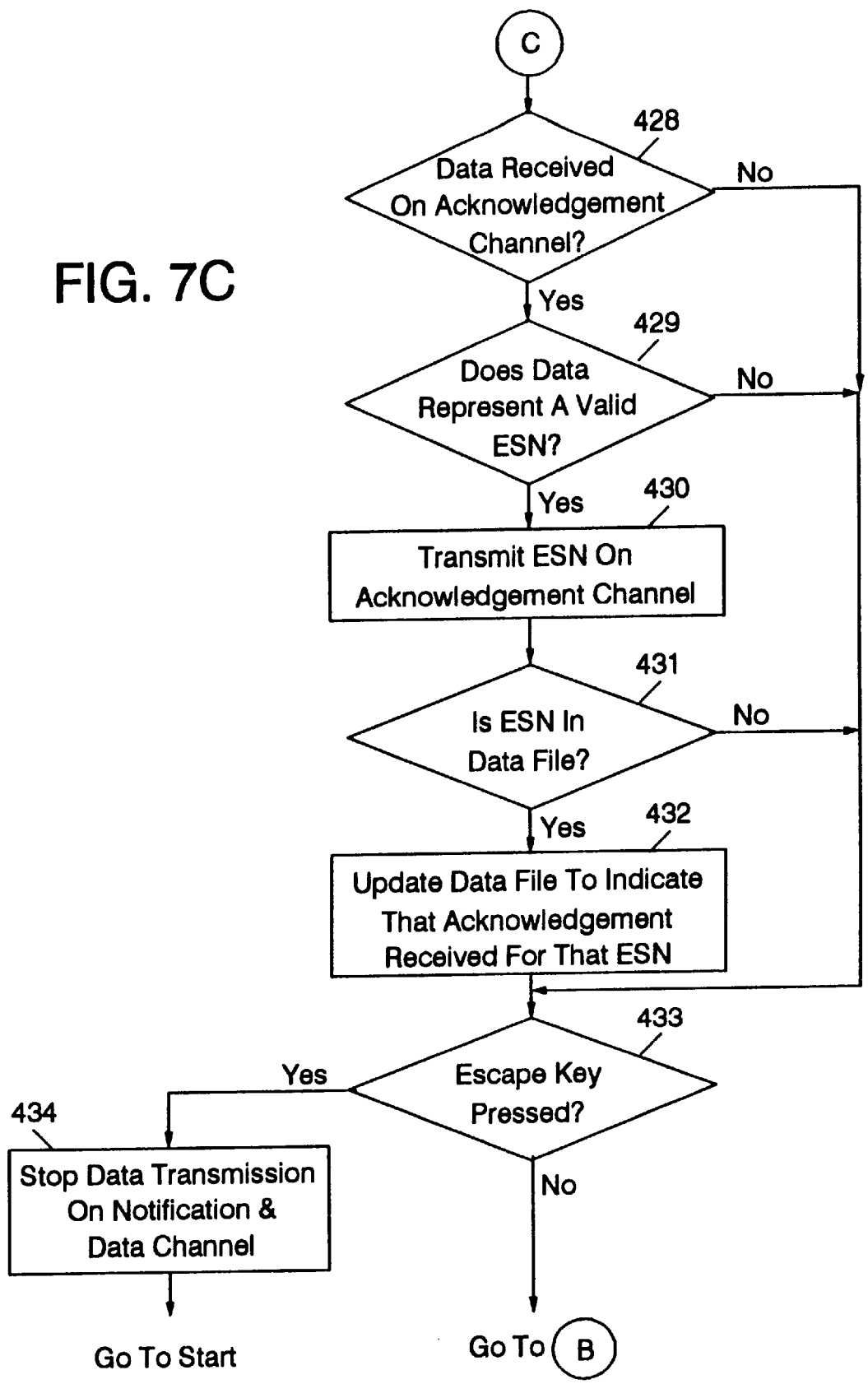

At step 428 of FIG. 7C, a test is made to determine if data has been received on the Acknowledgement Channel 470. If no data has been received on the Acknowledgement Channel, then the routine proceeds to step 433. If data has been received, a test is made in step 429 to determine if the received data represents a valid ESN. If not, then the routine proceeds to step 433.

If the received data does represent a valid ESN, then, in step 430, the ESN is transmitted on the Acknowledgement Channel 470. In step 431, a test is made to determine if the ESN is in the database. If yes, the database is updated to indicate that an acknowledgement was received for that ESN. In step 433, a test is made to determine if the escape key was pressed. If yes, then the program (in step 434) stops data transmission on the notification and data channels and returns to start. If no, the program jumps to point B of FIG. 7B.

FIG. 7D provides a flow diagram for the routine executed when the user selects "List" from the main menu of the wireless programmer 200 in step 405 of FIG. 7. Referring to FIG. 7D, a list is displayed in step 440 which includes the ESN for all devices 100 for which an acknowledgement was received. In step 441, a list is displayed which includes all devices 100 in the database which did not provide an acknowledgement. After step 441, the program returns to step 401 of FIG. 7 to redisplay the menu selections.

Figure 6:
FIG. 6 illustrates how data is exchanged between the wireless programmer and an electronic device on the authentication channel.
Figure 6:
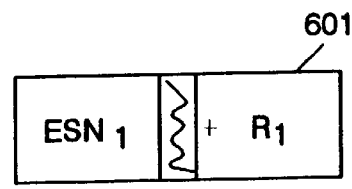

FIG. 6 illustrates more clearly the data exchanged between the device 100 and the wireless programmer 200 on the Authentication Channel 460 to authenticate the wireless programmer 200. On the Authentication Channel 460, a first device 100 initiates communication by transmitting an authentication request 600 comprising its ESN (denoted ESN1) to the wireless programmer 200. The Authentication Channel may transmit other authentication requests 602 comprising other ESNs (denoted as ESN2 and ESN3). (Refer to FIG. 6.). When received by the wireless programmer 200, ESN1 is used to search a database of ESN's installed in the wireless programmer 200 during configuration. If found in the database, the previously calculated authentication result R corresponding to the received ESN is fetched. If ESN1 is not found in the database, an invalid authentication result (e.g., zero) is used. For either case, an Authentication string comprising the ESN1 concatenated with Authentication result R1 is transmitted by wireless programmer 200 to device 100 as an authentication response 601.

When the authentication string is received by the device 100, the authentication result R is compared to the authentication result computed by the device 100. If the two numbers match, the wireless programmer 200 has been authenticated and the device 100 proceeds with the memory update process by tuning to the Data Channel. If the numbers do not match, the device 100 powers down and does not continue the memory update process.

FIG. 6 illustrates a case where the ESN's sent by two devices 100 partially overlap. In this case, the data received by the wireless programmer 200 will be corrupted; the wireless programmer will make no response to the corrupted ESN. Each device 100 will then wait a random time period and try again to authenticate the wireless programmer 200. The random delay period may be based on the ESN of the device 100. For example, it may be generated using a random number generation algorithm seeded with a portion of the device's ESN.

FIG. 5E illustrates the data exchanged between a device 100 and the wireless programmer 200 on the Acknowledgement Channel 470. As illustrated in FIG. 5E, the device 100 initiates communication on the acknowledgement channel with wireless programmer 200 by transmitting its ESN (ESN1) to the wireless programmer 200.

When wireless programmer 200 receives an ESN on the Acknowledgement Channel 470 (constituting an acknowledgement request), it searches the previously described ESN database. If the received ESN is not found in the ESN database, no action is taken by the wireless programmer 200. If the ESN is found in the database, the database entry for that ESN is updated to indicate that the phone has successfully updated memory. The database is also revised to reflect the updated revision level of software in the updated device 100.

The wireless programmer 200 then transmits an acknowledgement response containing the received ESN to the device 100. When the device 100 receives the acknowledgement response containing its ESN from the wireless programmer 200, the device 100 powers off. Preferably, the device 100 will make several acknowledgement attempts on the Acknowledgement Channel 400 if its ESN is not received from the wireless programmer 200.

Figure 6A:
FIG. 6A illustrates how data is exchanged between the wireless programmer and an electronic device on the acknowledgement channel.
Figure 6A:
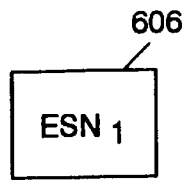

FIG. 6A illustrates a case where the ESN's 605 and 608 sent by two devices 100 on the Acknowledgement Channel 470 partially overlap. In such a case, the data received by the wireless programmer 200 will be corrupted, and the wireless programmer 200 will make no response on the Acknowledgement Channel 470. Each device 100 will then implement a time-out and try again until ESN 606 is transmitted by wireless programmer 200 to device as an authentication response 606 (see FIG. 6A).

Electronic Device Logical Operation

Figure 8:
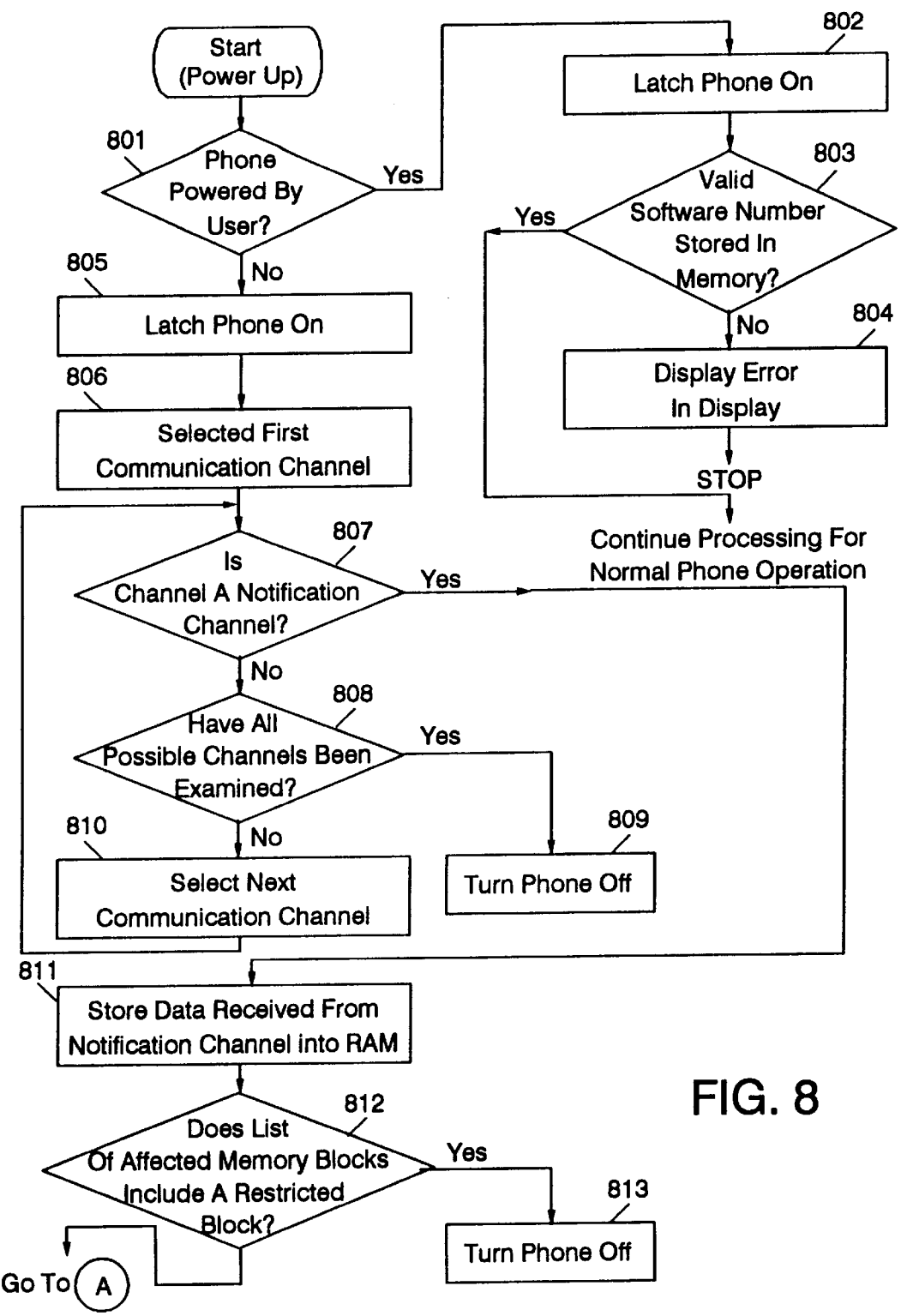

FIG. 8, along with FIGS. 8A, 8B, 8B1, 8B2 and 8C provide a flowchart for the wireless update program executed in a device 100. Referring to FIG. 8, the program starts at power up in step 801. In step 801, a test is made to determine if the device 100 was powered-up by user action (as described above). If the device 100 was powered on by the user, the device 100 is latched on (in step 802) and a test is made to determine if a valid software revision number is stored in memory (in step 803). If a valid software revision number is not present, then an error condition is shown in the display 127 and program execution stops. Otherwise, processing continues to provide normal operation for the user.

If the device 100 was not turned on by user action but instead was turned on by the timer circuit 190, the program proceeds to step 805, where the device 100 is latched on.

In steps 806 through 810, the device 100 searches available communication paths for a notification channel. (As described above, the Notification Channel 455 contains a field which identifies it as a notification channel). Beginning with a first possible communication channel (step 806) all channels are tested until either no notification channels are found (and the device 100 turns off) or a notification channel is found. If a notification channel is found, processing continues with step 811.

In step 811, the following data from the data channel is stored in RAM:

A. Revision number of the new software program to be downloaded.

B. Location (i.e., frequency, time slot, spreading code, etc.) for the authentication channel, data channel and acknowledgement channel.

C. List of block numbers of memory to be altered.

In step 812, the list of block numbers of memory to be altered (received from the notification channel) is compared to a list of restricted blocks; if any restricted blocks are in the list from the notification channel, the device 100 is turned off. Otherwise, processing continues at point A in FIG. 8A.

Figure 8A:
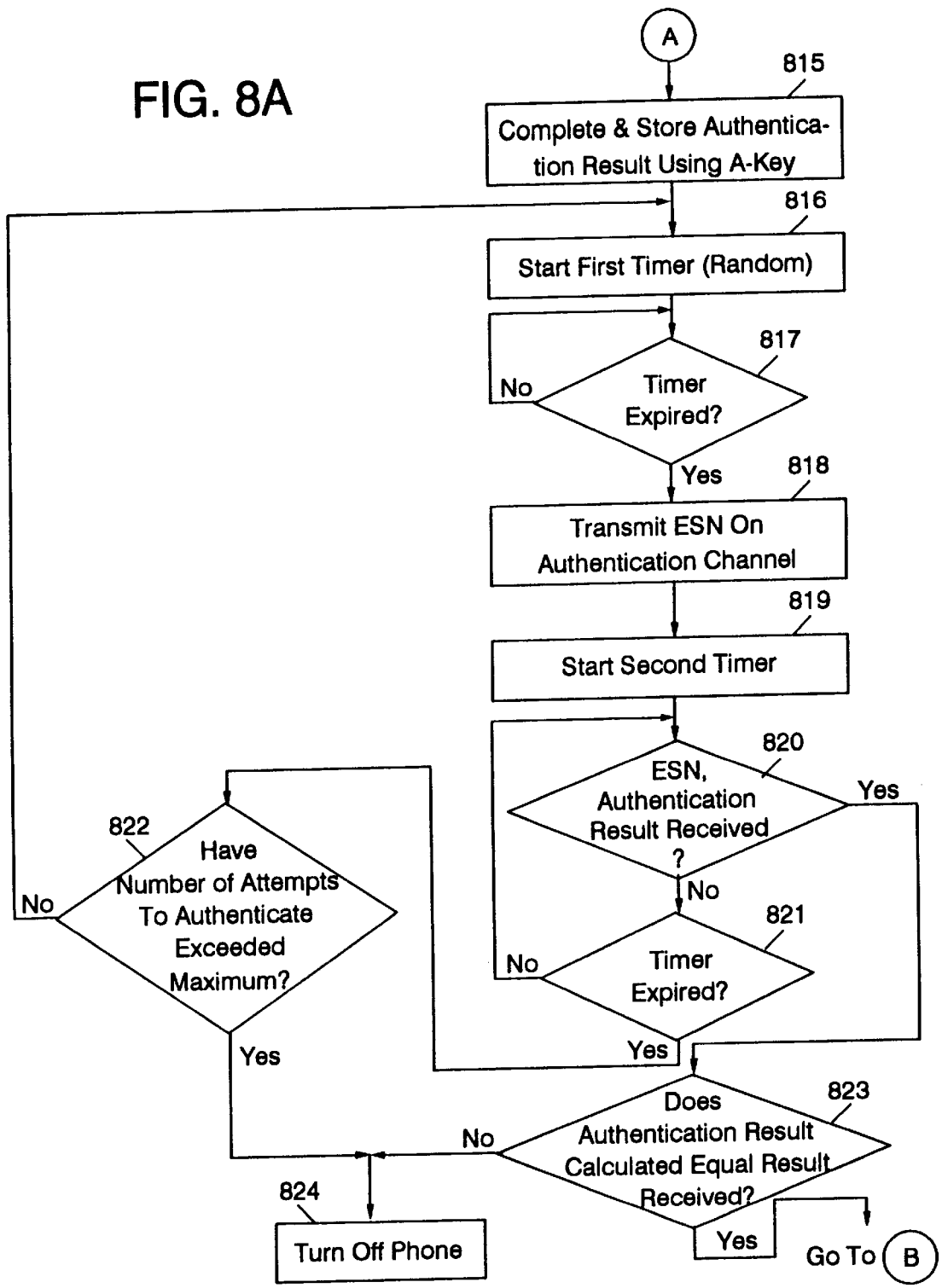

In step 815 of FIG. 8A, the device 100 computes and stores the authentication result R using the device's pre-stored A-key.

In steps 816 through 823, the device 100 attempts to communicate with the wireless programmer 200 on the Authentication Channel 460 as follows: A first timer is started in the device 100 in step 816. The starting value of the timer is random, which creates a random delay before communications are attempted. After the timer has expired (step 817), the device 100 transmits its ESN on the Authentication Channel 460 (step 818). In steps 819, 820 and 821, the device 100 waits a pre-determined period of time (as controlled by a second timer) for a response from the wireless programmer 200. If no response is received within the second time-out period, the program proceeds to step 822. If a response is received, the program proceeds to step 823.

In step 822, a test is made to determine if the maximum number of attempts to authenticate have been exceeded. If not, the program returns to step 816 to make another attempt. If a previous authentication attempt failed due to a data collision with another device 100 (i.e. two or more devices 100 have sent data on the Authentication Channel 460 at the same time), the random delay caused by the random timer in step 816 will tend to prevent additional collisions with the same devices 100. If the maximum number of attempts has been exceeded, the device 100 turns itself off in step 824.

In step 823, the device 100 checks if the received authentication result R matches its computed authentication result. If not, the phone turns itself off in step 824. If the authentication results match, the wireless programmer has been authenticated and the program proceeds to point B in FIG. 8B1.

At point B (step 840 of FIG. 8B1), the Data Channel 465 is acquired. In subsequent steps, the data from the Data Channel 465 is used to update the flash memory block by block. In step 841, a test is made to determine if the channel tuned contains an identifier which indicates that it is indeed the data channel. If not, the device 100 is turned off in step 842. If yes, the software revision number (which is either located within a data location in the flash or in another non-volatile memory) is set to an invalid number (in step 843). In step 853, the program used to write or read data to flash is copied from the flash and replicated in RAM. In step 844, the received data stream is monitored until data is received which indicates the beginning of a data string for any block/sub-block. A test is then made (in step 845) to determine if the data string for that sub-block has already been updated in flash. If yes, the program returns to step 844 to await data for the next sub-block. If no, then subsequent steps are executed to store the data string in RAM and use it to update flash, as described below.

In step 846, the block number/sub-block number and data string for the sub-block are stored in RAM. In step 847 of FIG. 8B2, the data string is loaded into the sub-block of the flash. In step 848, the data just stored in the flash sub-block is read from flash and compared to the data in RAM (in step 849). If the comparison is not successful, the program returns to step 844 of FIG. 8B1. If successful, data is stored in RAM which records the sub-block number and block number which was successfully updated (in step 850). In step 851, a test is made to determine if all sub-blocks (for all blocks) have been updated. If no, the program returns to step 844. If yes, the software revision number is updated with the new value.

Any programming steps referenced above which read or write data to flash (steps 847, 848) are preferably executed from RAM.

Figure 8C:
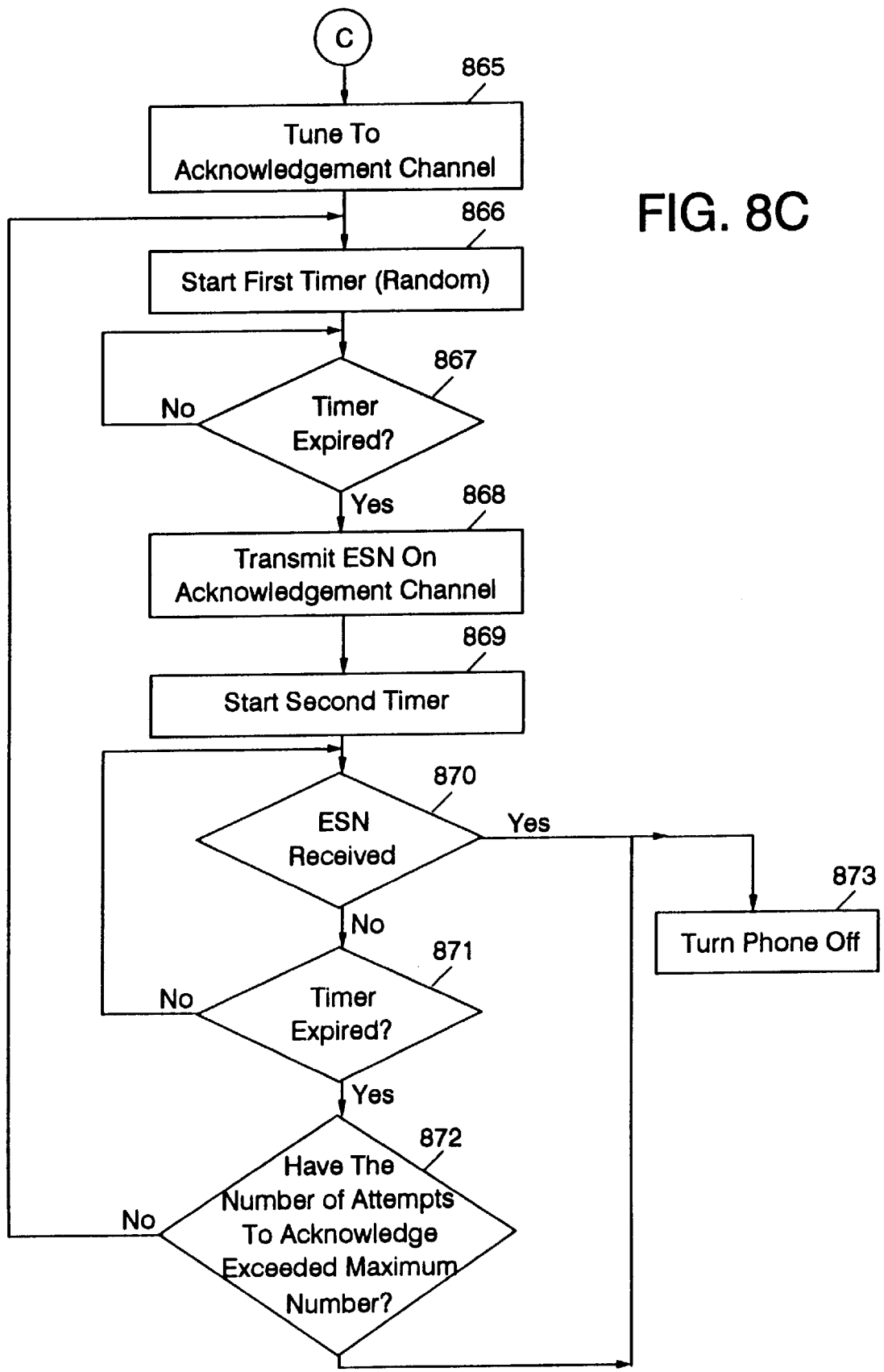

After step 852 of FIG. 8B2, processing continues at point C of FIG. 8C. In FIG. 8C, the device 100 attempts to communicate with the wireless programmer 200 on the Acknowledgement Channel 470. The Acknowledgement Channel is tuned in step 865. A first timer is started in step 866 which has a starting value which is random. This creates a random delay before communications are attempted. After the timer has expired (step 867), the device 100 transmits its ESN on the Acknowledgement Channel (step 868). In steps 869, 870 and 871, the device 100 waits a pre-determined period of time (as controlled by a second timer) for a response from the wireless programmer 200. If no response is received within the time-out period, the program proceeds to step 872. If a response is received, the device 100 is turned off in step 873.

In step 872, a test is made to determine if the maximum number of attempts to acknowledge have been exceeded. If not, the program returns to step 866 to make another attempt. If a previous acknowledgement attempt failed due to a data collision with another device 100, the random delay caused by the random timer in step 866 will tend to prevent additional collisions with the same phone(s). If the maximum number of attempts has been exceeded, the device 100 turns itself off in step 873.

Conclusion

The wireless programmer 200 and the device 100 being programmed both possess the capability to receive and transmit data via a wireless communication link. It would also be possible to employ the concepts presented herein to update memory in a device capable only of receiving wireless signals. Modifications necessary to utilize the present invention in connection with a receive-only device will be readily apparent to one skilled in the art upon reviewing this Specification. For example, with regard to authentication for a receive-only device, the following is one alternative: Continuously broadcast an ESN and Authentication result on one channel for all devices being programmed. The wireless device, upon receiving its specific ESN and Authentication result pair would simply compare the result received with a result stored at time of manufacture to authenticate the wireless programmer.

A system and method for wirelessly updating the memory of an electronic device has been described. The system is particularly advantageous for updating a program or data stored in nonvolatile memory in an electronic device such as a cellular telephone. The system and method may be used for example at a manufacturing plant for simultaneously updating the memories of a number of devices, or for updating devices that have already been shipped to consumers one at a time.

What is claimed is:

1. A system for updating data stored in a nonvolatile memory of an electronic device, comprising:

(a) a programming unit comprising a first microprocessor, a first wireless communication interface and a memory coupled to said first microprocessor, said memory containing update data;

(b) an electronic device comprising:
  (i) a second microprocessor operable in a plurality of modes, said plurality of modes including a memory update mode,
  (ii) a nonvolatile memory coupled to said second microprocessor, and
  (iii) a second wireless communication interface coupled to said second microprocessor for receiving update data from said programming unit, wherein update data received by said second wireless communication interface is stored in said nonvolatile memory by said second microprocessor responsive to receipt of said update data while said second microprocessor is in said memory update mode; and
(c) a wireless communication path between said programming unit and said electronic device;
  wherein said wireless communication path comprises a unidirectional communication channel for communicating data from said programming unit to said electronic device and a bidirectional communication channel for communicating data between said programming unit and said electronic device; and
  wherein said unidirectional communication channel communicates notification data and update data to said electronic device, said notification data being repeated in a plurality of notification frames and said update data being repeated in a plurality of update data frames.

2. A system for updating data stored in a nonvolatile memory of an electronic device, comprising:
  (a) a programming unit comprising a first microprocessor, a first wireless communication interface and a memory coupled to said first microprocessor, said memory containing update data;
  (b) an electronic device comprising:
    (i) a second microprocessor operable in a plurality of modes, said plurality of modes including a memory update mode,
    (ii) a nonvolatile memory coupled to said second microprocessor, and
    (iii) a second wireless communication interface coupled to said second microprocessor for receiving update data from said programming unit, wherein update data received by said second wireless communication interface is stored in said nonvolatile memory by said second microprocessor responsive to receipt of said update data while said second microprocessor is in said memory update mode; and
  (c) a wireless communication path between said programming unit and said electronic device;
    wherein said wireless communication path comprises a unidirectional communication channel for communicating data from said programming unit to said electronic device and a bidirectional communication channel for communicating data between said programming unit and said electronic device; and
    wherein each of said plurality of notification frames is divided into a plurality of fields including a channel identification field and a location field.

3. A system for updating, data stored in a nonvolatile memory of an electronic device, comprising:
  (a) a programming unit comprising a first microprocessor, a first wireless communication interface and a memory coupled to said first microprocessor, said memory containing update data;
  (b) an electronic device comprising:
    (i) a second microprocessor operable in a plurality of modes, said plurality of modes including a memory update mode,
    (ii) a nonvolatile memory coupled to said second microprocessor, and
    (iii) a second wireless communication interface coupled to said second microprocessor for receiving update data from said programming unit, wherein update data received by said second wireless communication interface is stored in said nonvolatile memory by said second microprocessor responsive to receipt of said update data while said second microprocessor is in said memory update mode; and
  (c) a wireless communication path between said programming unit and said electronic device;
    wherein said wireless communication path comprises a unidirectional communication channel for communicating data from said programming unit to said electronic device and a bidirectional communication channel for communicating data between said programming unit and said electronic device; and
    wherein each of said plurality of update data frames is divided into a plurality of fields including a block number field and a data field.

4. A system for updating data stored in a nonvolatile memory of an electronic device, comprising:
  (a) a programming unit comprising a first microprocessor, a first wireless communication interface and a memory coupled to said first microprocessor, said memory containing update data;
  (b) an electronic device comprising:
    (i) a second microprocessor operable in a plurality of modes, said plurality of modes including a memory update mode,
    (ii) a nonvolatile memory coupled to said second microprocessor, and
    (iii) a second wireless communication interface coupled to said second microprocessor for receiving update data from said programming unit, wherein update data received by said second wireless communication interface is stored in said nonvolatile memory by said second microprocessor responsive to receipt of said update data while said second microprocessor is in said memory update mode; and
  (c) a wireless communication path between said programming unit and said electronic device;
    wherein said wireless communication path comprises first and second unidirectional communication channels for communicating data from said programming unit to said electronic device and first and second bidirectional communication channels for communicating data between said programming unit and said electronic device; and
    wherein said first unidirectional communication channel communicates notification data to said electronic device, said notification data being repeated in a plurality of notification frames.

5. A system for updating data stored in a nonvolatile memory of an electronic device, comprising:
  (a) a programming unit comprising a first microprocessor, a first wireless communication interface and a memory coupled to said first microprocessor, said memory containing update data;
  (b) an electronic device comprising:
    (i) a second microprocessor operable in a plurality of modes, said plurality of modes including a memory update mode, (ii) a nonvolatile memory coupled to said second microprocessor, and (iii) a second wireless communication interface coupled to said second microprocessor for receiving update data from said programming unit, wherein update data received by said second wireless communication interface is stored in said nonvolatile memory by said second microprocessor responsive to receipt of said update data while said second microprocessor is in said memory update mode; and (c) a wireless communication path between said programming unit and said electronic device;

wherein said wireless communication path comprises first and second unidirectional communication channels for communicating data from said programming unit to said electronic device and first and second bidirectional communication channels for communicating data between said programming unit and said electronic device; and wherein said second unidirectional communication channel communicates update data to said electronic device, said update data being repeated in a plurality of update data frames.

6. The system as recited in claim 4, wherein each of said plurality of notification frames is divided into a plurality of fields including a channel identification field and a location field.

7. The system as recited in claim 5, wherein each of said plurality of update data frames is divided into a plurality of fields including a block number field and a data field.

8. A programming unit comprising:

a microprocessor, a wireless communication interface, and a memory coupled to said microprocessor, said memory containing a plurality of update data sets for updating the memory of one or more electronic devices, said plurality of update data sets corresponding to a plurality of software revision levels;

means for selecting an update data set corresponding to a desired software revision level for a particular electronic device; and means for receiving one or more electronic devices;

wherein the programming unit transmits said selected update data set to said one or more electronic devices over said wireless communication interface and receives signals from said one or more electronic devices acknowledging receipt of said update data set; and wherein said means for receiving comprises a multi-compartmented carousel for selectively receiving and individually delivering a plurality of electronic devices.

9. In a system comprising, a programming unit and a plurality of electronic devices, the programming unit and the plurality of electronic devices each having a microprocessor and a wireless communication interface, each of said plurality of electronic devices additionally having a respective nonvolatile memory and means for placing said electronic device in a memory update mode, a method of updating data stored in the nonvolatile memory of one of said plurality of electronic devices, comprising:

placing the programming unit in proximity to said plurality of electronic devices; and activating a wireless update routine in the programming unit;

further comprising: in the programming unit:
transmitting notification data on a notification channel;
transmitting update data on a data channel;
monitoring an authentication channel for the receipt of an authentication request; and
responsive to the receipt of a valid authentication request, monitoring an acknowledgement channel for the receipt of an acknowledgement signal from said one of said electronic devices; and in said one of the plurality of electronic devices:
responsive to said electronic device being placed in said memory update mode, searching for the notification channel;
reading data from the notification channel indicative of the location of the data channel;
reading undated data from the data channel;
storing the updated data in the nonvolatile memory of said one of said electronic devices; and
transmitting an acknowledgement signal on said acknowledgement channel; further comprising: in the programming unit:
responsive to receiving an authentication request, selecting, an authentication string based on a device identification code contained in said authentication request; and
transmitting an authentication response on said authentication channel, said authentication response containing said authentication string; and in said one of the plurality of electronic devices:
responsive to locating said notification channel, transmitting an authentication request on said authentication channel said authentication request containing a device identification code;
receiving an authentication response on said authentication channel, said authentication response containing an authentication string; and
determining if said authentication string is correct;
further comprising: in said one of the plurality of electronic devices:
responsive to a failure to receive an authentication response within a predetermined time period:
waiting for a timeout period; and
re-transmitting the authentication request; and
wherein said timeout period is a random delay.

10. In a system comprising a programming unit and a plurality of electronic devices, the programming, unit and the plurality of electronic devices each having a microprocessor and a wireless communication interface, each of said plurality of electronic devices additionally having a respective nonvolatile memory and means for placing said electronic device in a memory update mode, a method of updating data stored in the nonvolatile memory of one of said plurality of electronic devices, comprising:

placing the programming unit in proximity to said plurality of electronic devices; and activating a wireless update routine in the programming unit;

further comprising: in the programming unit:
transmitting notification data on a notification channel;
transmitting update data on a data channel;
monitoring an authentication channel for the receipt of an authentication request; and
responsive to the receipt of a valid authentication request, monitoring an acknowledgement channel for the receipt of an acknowledgement signal from said one of said electronic devices; and in said one of the plurality of electronic devices:
   responsive to said electronic device being placed in said memory update mode, searching for the notification channel;
   reading data from the notification channel indicative of the location of the data channel;
   reading updated data from the data channel;
   storing the updated data in the nonvolatile memory of said one of said electronic devices; and
   transmitting an acknowledgement signal on said acknowledgement channel;
further comprising: in the programming unit:
   responsive to receiving an authentication request, selecting an authentication string based on a device identification code contained in said authentication request; and
   transmitting an authentication response on said authentication channel, said authentication response containing said authentication string; and
in said one of the plurality of electronic devices:
   responsive to locating said notification channel, transmitting an authentication request on said authentication channel, said authentication request containing a device identification code;
   receiving an authentication response on said authentication channel, said authentication response containing an authentication string; and
   determining if said authentication string is correct;
further comprising: in said one of the plurality of electronic devices:
   responsive to a failure to receive an authentication response within a predetermined time period:
      waiting for a timeout period; and
      re-transmitting the authentication request; and
   wherein said timeout period is a predetermined period based on an identification number unique to said one of said plurality of electronic devices.

11. In a system comprising a programming unit and a plurality of electronic devices, the programming unit and the plurality of electronic devices each having a microprocessor and a wireless communication interface, each of said plurality of electronic devices additionally having a respective nonvolatile memory and means for placing said electronic device in a memory update mode, a method of updating data stored in the nonvolatile memory of one of said plurality of electronic devices, comprising:
   placing the programming unit in proximity to said plurality of electronic devices; and
   activating a wireless update routine in the programming unit;
   further comprising: in the programming unit:
      transmitting notification data on a notification channel;
      transmitting update data on a data channel;
      monitoring an authentication channel for the receipt of an authentication request; and
      responsive to the receipt of a valid authentication request, monitoring an acknowledgement channel for the receipt of an acknowledgement signal from said one of said electronic devices; and
   in said one of the plurality of electronic devices:
      responsive to said electronic device being placed in said memory update mode, searching for the notification channel;
      reading data from the notification channel indicative of the location of the data channel;
      reading updated data from the data channel;
      storing the updated data in the nonvolatile memory of said one of said electronic devices; and
      transmitting an acknowledgement signal on said acknowledgement channel;
   further comprising:
      in said one of the plurality of electronic devices:
         after transmitting the acknowledgement signal on the acknowledgement channel, waiting a predetermined time period to receive an acknowledgement response; and
         responsive to a failure to receive an acknowledgement response:
            waiting for a timeout period; and
            re-transmitting the acknowledgement signal; and
   wherein said timeout period is a random delay.

12. In a system comprising a programming unit and a plurality of electronic devices, the programming unit and the plurality of electronic devices each having a microprocessor and a wireless communication interface, each of said plurality of electronic devices additionally having a respective nonvolatile memory and means for placing said electronic device in a memory update mode, a method of updating data stored in the nonvolatile memory of one of said plurality of electronic devices, comprising:
   placing the programming unit in proximity to said plurality of electronic devices; and
   activating a wireless update routine in the programming unit;
   further comprising: in the programming unit:
      transmitting notification data on a notification channel;
      transmitting update data on a data channel;
      monitoring an authentication channel for the receipt of an authentication request; and
      responsive to the receipt of a valid authentication request, monitoring an acknowledgement channel for the receipt of an acknowledgement signal from said one of said electronic devices; and
   in said one of the plurality of electronic devices:
      responsive to said electronic device being placed in said memory update mode, searching for the notification channel;
      reading data from the notification channel indicative of the location of the data channel;
      reading updated data from the data channel;
      storing the updated data in the nonvolatile memory of said one of said electronic devices; and
      transmitting an acknowledgement signal on said acknowledgement channel;
   further comprising:
      in said one of the plurality of electronic devices:
         after transmitting the acknowledgement signal on the acknowledgement channel, waiting a predetermined time period to receive an acknowledgement response; and
         responsive to a failure to receive an acknowledgement response:
            waiting for a timeout period; and
            re-transmitting the acknowledgement signal; and
   wherein said timeout period is a predetermined period based on an identification number unique to said one of said plurality of electronic devices.

* * * * *